United States Patent [19]

Brosius et al.

[11] Patent Number: 4,858,811
[45] Date of Patent: * Aug. 22, 1989

[54] POWER ACTUATED TOOL WITH MAGAZINE FEED

[75] Inventors: James R. Brosius; Ralph C. Brosius, both of St. Louis County, Mo.

[73] Assignee: Eldorado Cartridge Corporation, Boulder City, Nev.

[*] Notice: The portion of the term of this patent subsequent to Aug. 18, 2004 has been disclaimed.

[21] Appl. No.: 82,385

[22] Filed: Aug. 6, 1987

Related U.S. Application Data

[63] Continuation-in-part of Ser. No. 800,610, Nov. 21, 1985.

[51] Int. Cl.⁴ .............................................. D25C 1/14
[52] U.S. Cl. ...................................... 227/10; 227/125
[58] Field of Search ................... 227/8, 9, 10, 11, 120, 227/125, 130, 132

[56] References Cited

U.S. PATENT DOCUMENTS

| | | | |
|---|---|---|---|
| 3,670,942 | 6/1972 | Pomeroy | 227/10 |
| 3,991,925 | 11/1976 | Büchel | 227/10 |
| 4,051,990 | 10/1977 | Chromy et al. | 227/10 |
| 4,463,888 | 8/1984 | Geist et al. | 227/125 X |
| 4,655,380 | 4/1987 | Haytayan | 227/9 |
| 4,687,126 | 8/1987 | Brosius et al. | 227/10 |
| 4,741,467 | 5/1988 | Glassner et al. | 227/10 X |

Primary Examiner—Paul A. Bell
Attorney, Agent, or Firm—Paul M. Denk

[57] ABSTRACT

A fastener driving tool for driving a nail or anchor, the tool disposed for feeding of a cartridge strip of explosive cartridges through the tool, which upon ignition drive a plurality of magazined fasteners into a surface; the tool incorporating a handle, a tubular chamber, a piston and combustion chamber within the tubular chamber, the combustion chamber receiving a cartridge in preparation for firing, which upon ignition, propels the piston forwardly for driving of a nail, a fastener housing located forwardly of the tubular chamber, and provided for shifting of a strip of fasteners held by a magazine upwardly through the tool during repeated tool usage.

44 Claims, 14 Drawing Sheets

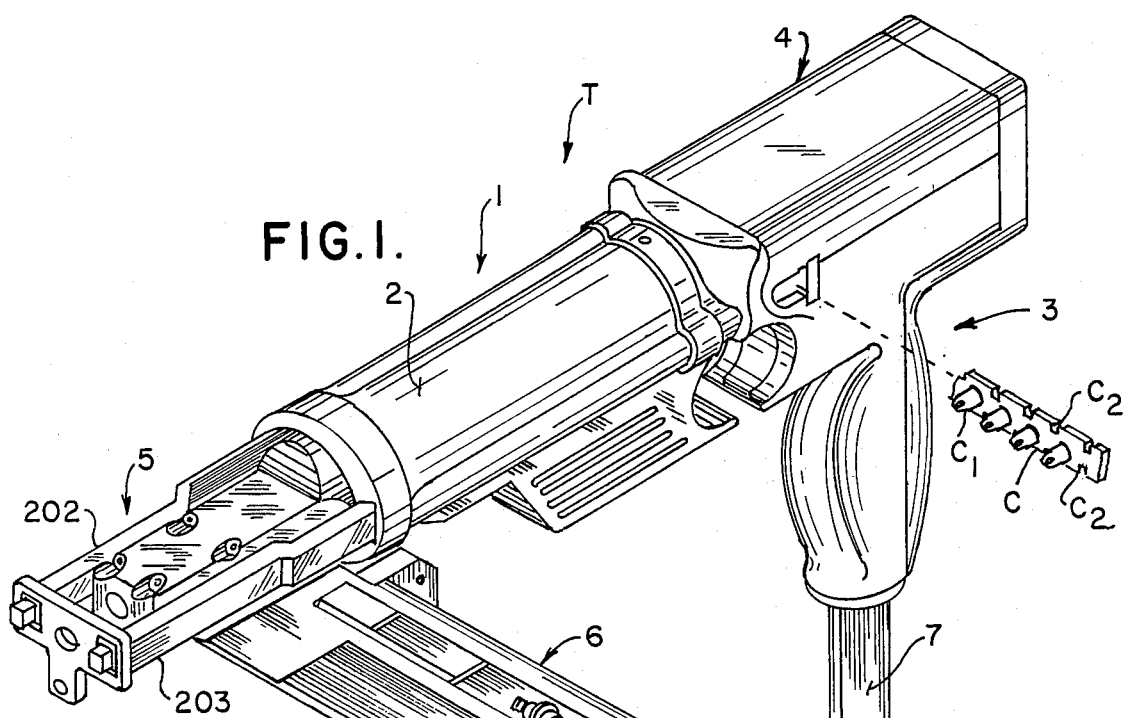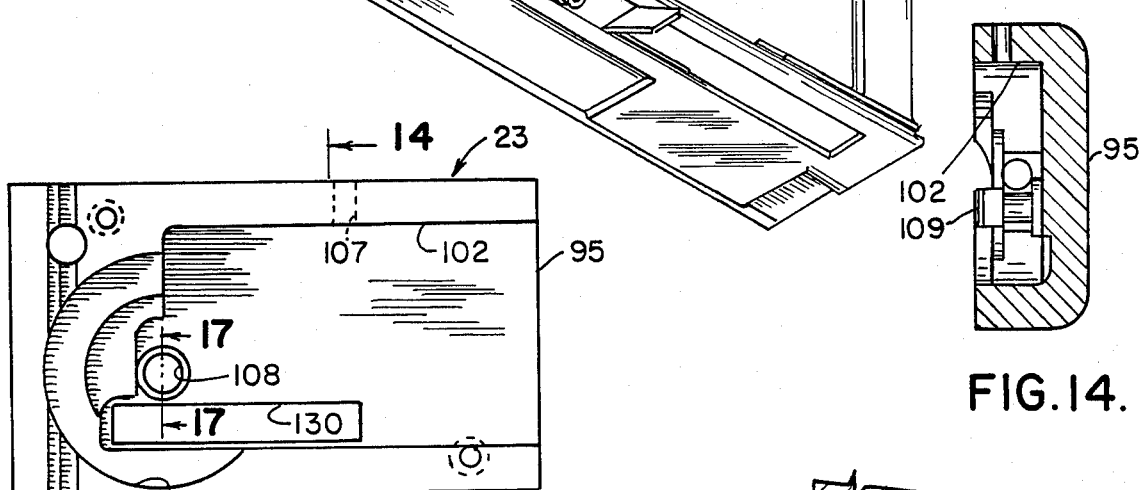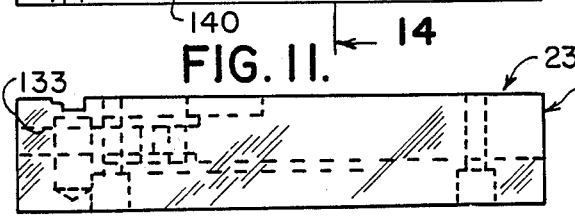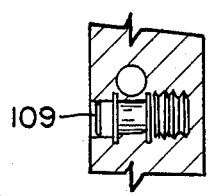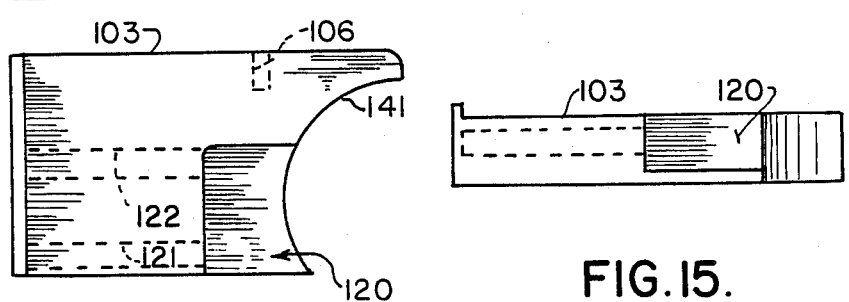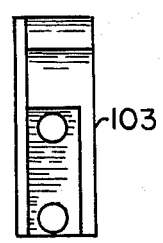

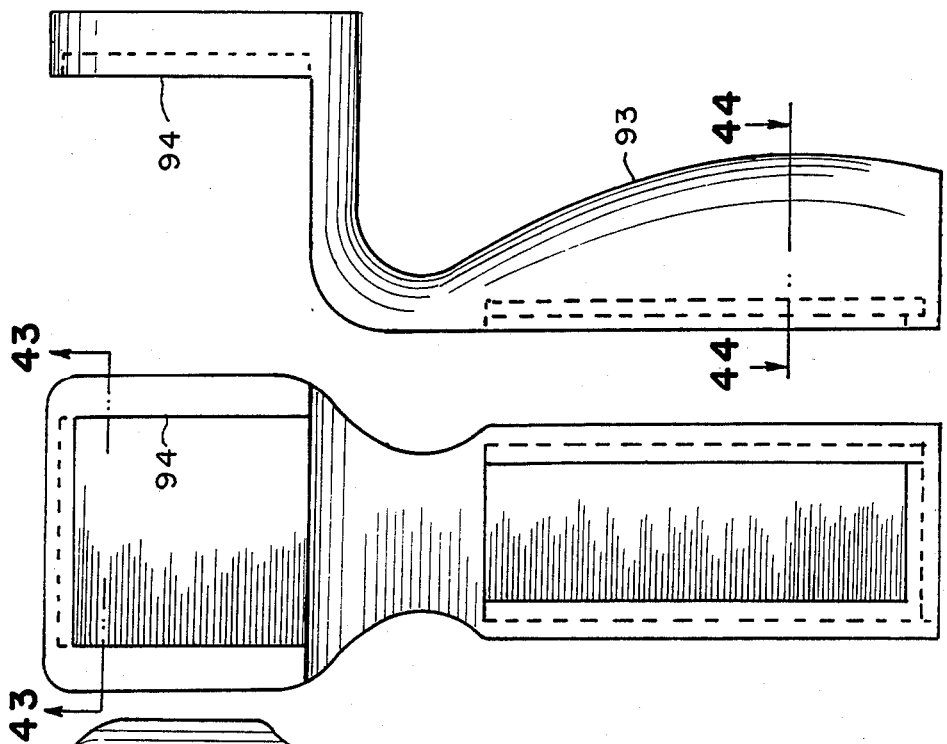
FIG. 42.
FIG. 41.
FIG. 9.
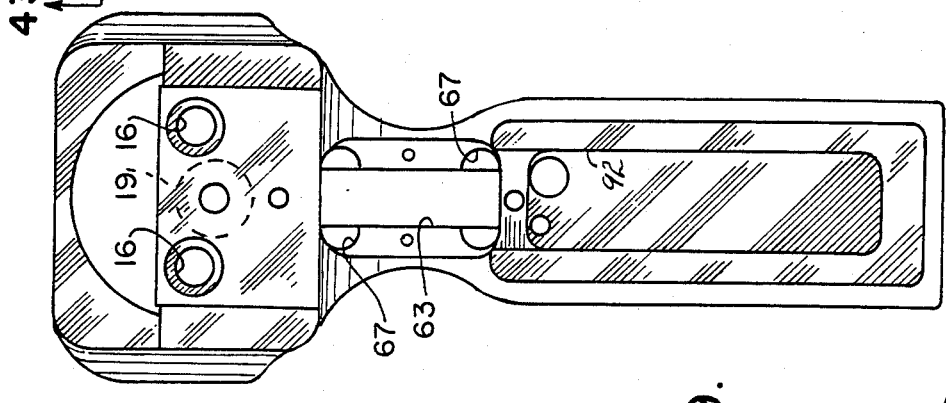
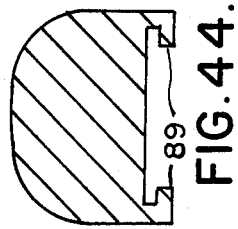
FIG. 44.
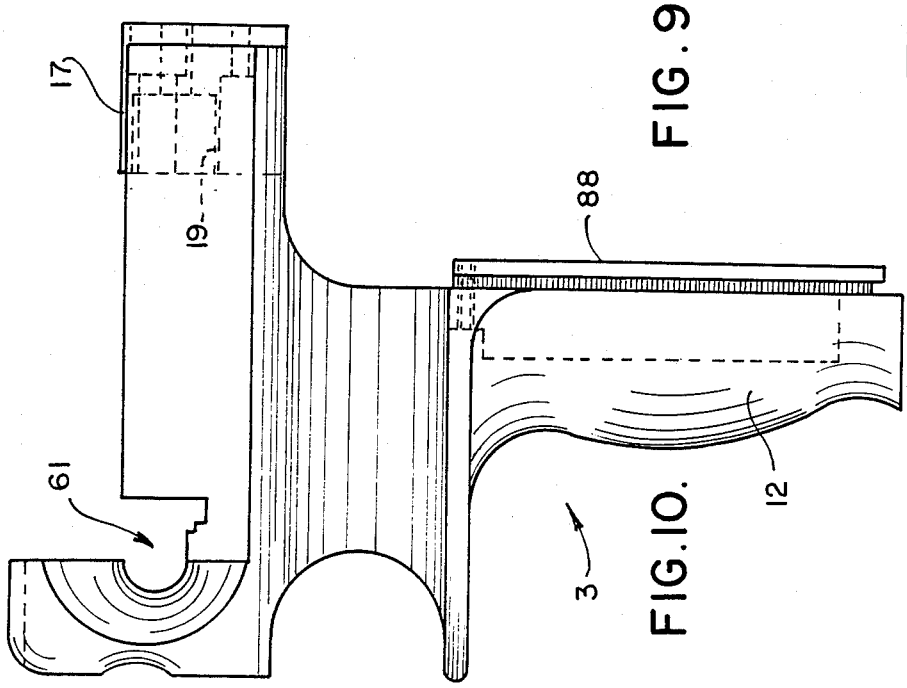
FIG. 10.
FIG. 43.

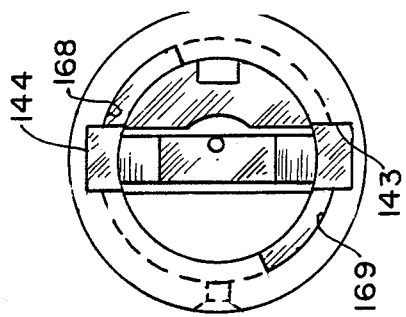
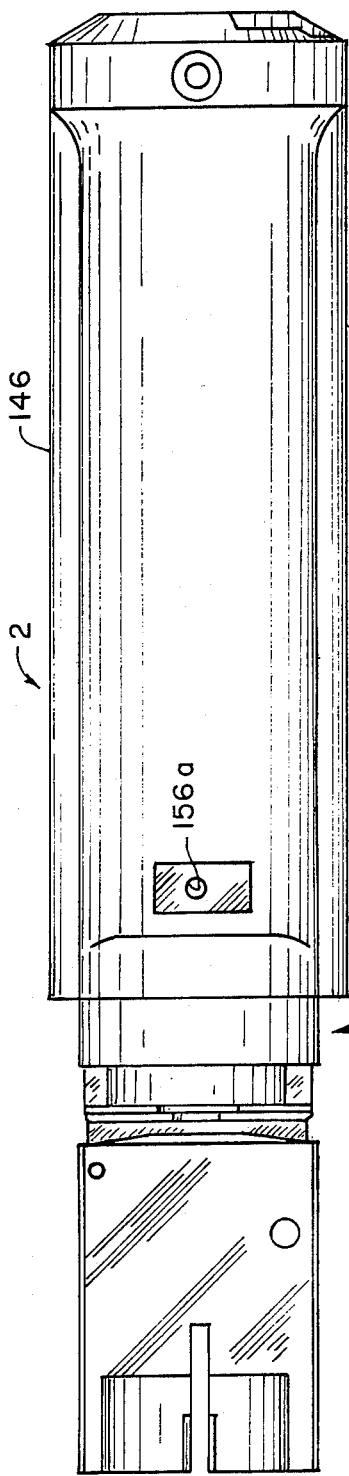
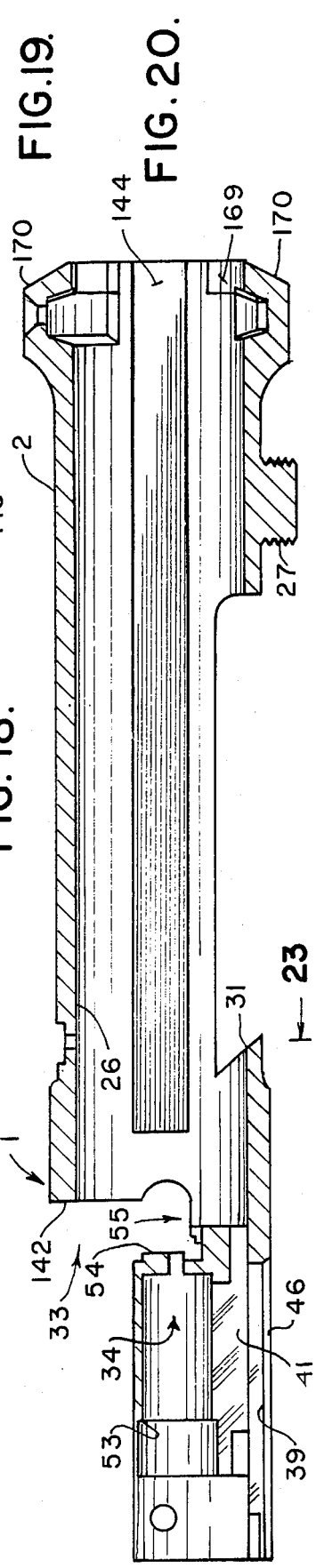
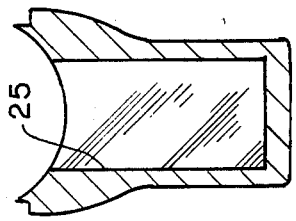
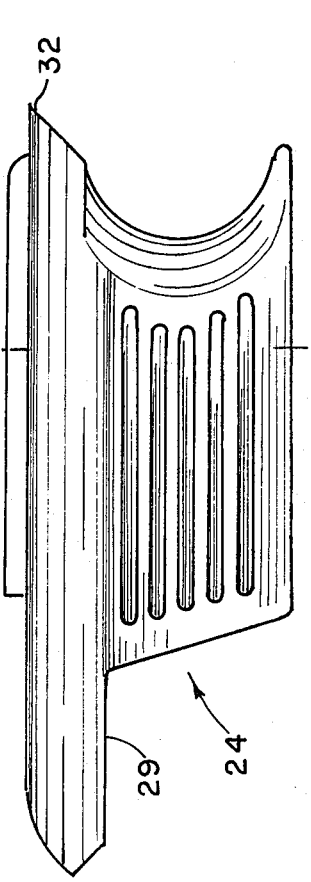

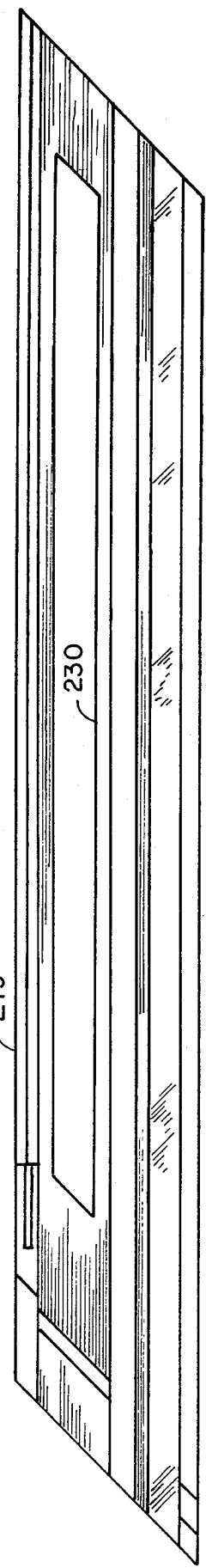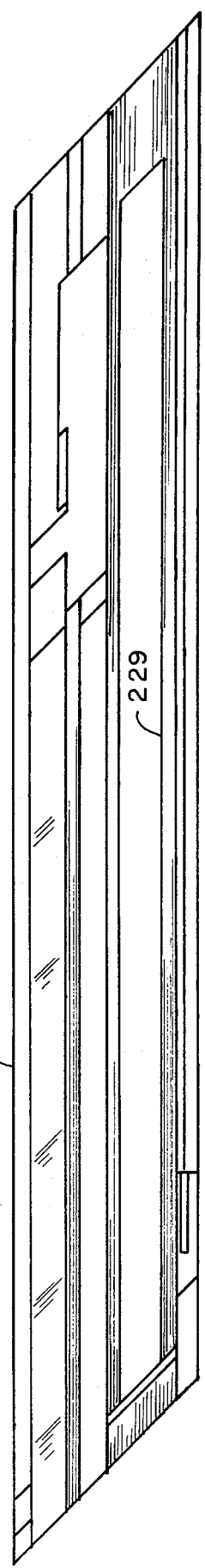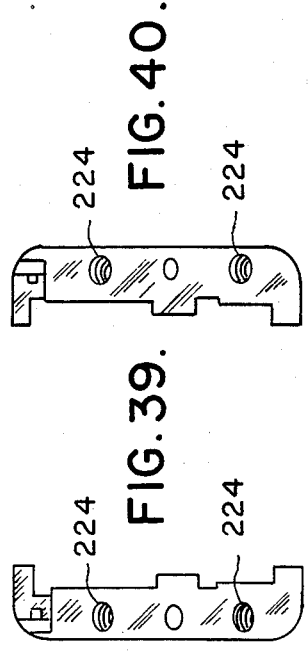

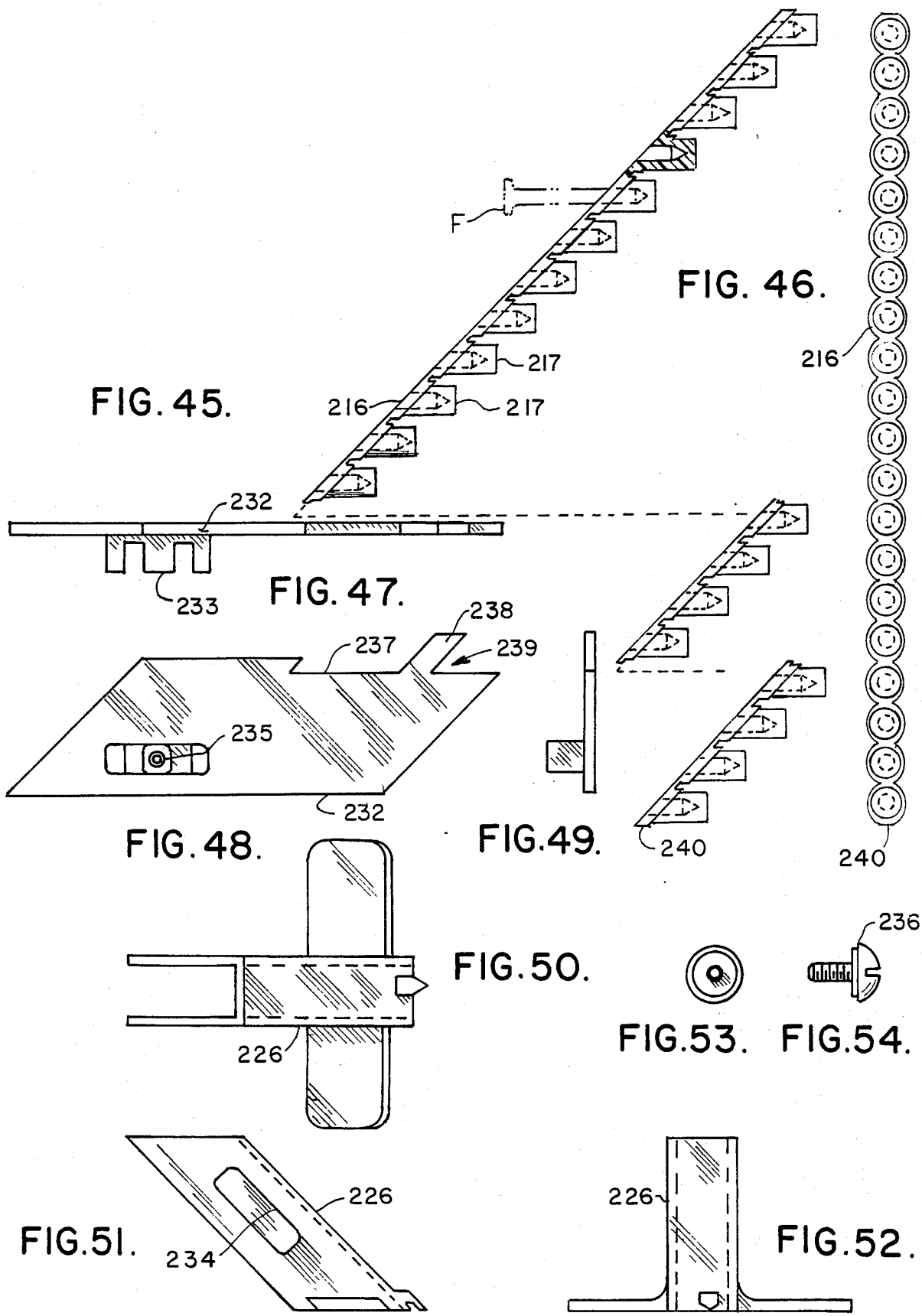

POWER ACTUATED TOOL WITH MAGAZINE FEED

CROSS REFERENCE TO RELATED APPLICATION

This application comprises a continuation-in-part of the patent application of the same inventors, Ser. No. 800,610, filed on Nov. 21, 1985; all of said applications being owned by a common assignee.

BACKGROUND OF THE INVENTION

This invention generally relates to a fastener driving tool, and more specifically pertains to a fully indexable tool for use for driving fasteners or anchors into a hard or supporting surface, through the application of an explosive force generated from a fully indexable strip of cartridges, and which tool provides a magazine feed for delivery of the fasteners sequentially into alignment with its driving means during operational use of this invention.

There are many and various apparatuses available for driving anchoring means into material surfaces. Most of these type of apparatuses are usually applied in the construction industry, particularly in heavy industrial applications, and are useful in application for driving of fasteners into those types of supporting or rigid surfaces which, under ordinary conditions, usually cannot otherwise have a nail or other anchoring means effectively driven into them due to the heavy density of their surface and structure. Examples of such surfaces include concrete walls or floors, the various steel beams, studs, or the like, which are the type of surfaces into which the standard fastener normally cannot be applied, as through either a manual or other power tool usage, and therefore, requires the operation and application of the explosive force for driving the fastener under significant pressures into these type of harden end structural components. In addition, some of the prior art devices add the element of automatics into their functioning, which not only provides for the sequential feed of the explosive cartridges into and through the unit during its functioning, so as to always have another cartridge readily available for ignition, as when the trigger is actuated and its firing pin released, but likewise, some such tools incorporate the concept of the magazine feed, into its instrument, for the purpose of sequentially delivering the fasteners, one at a time, into alignment with the piston means for the tool so that once an instrument is fired, it is immediately reset for ready application.

Examples of prior types of devices for driving anchors, or the like, are shown in the prior U.S. Pat. No. 4,051,990, which discloses a form of magazine feed, for delivery and alignment of anchors into position axially arranged with the driving piston assembly for the shown device. Other types of means for delivering at least the explosive cartridges to a device for driving anchoring means is shown in the U.S. Pat. No. 3,494,532. Additional magazine feed type of power actuated piston tool is shown in the U.S. Pat. No. 3,506,178. Likewise, magazine feed devices for use in conjunction with a gun means for driving a fastener is shown in the U.S. Pat. No. 3,991,9215, disclosing a movably mounted magazine for feeding fastening elements into a gun like barrel.

Other types of prior art tools for driving fasteners, and some of which include the magazine feed type of delivery of fastening elements to and in alignment with the driving piston for the shown instruments are disclosed in the U.S. Pat. Nos. 3,331,546; 3,682,364; 3,514,026; 4,485,952; 3,786,980; 3,670,942; 3,042,008; 2,702,902; 3,891,133; and 4,200,213.

Other related instruments for driving fasteners, staplers, or the like, are shown in the U.S. Pat. No. 3,170,487, and U.S. Pat. No. Re. 26,262. Furthermore, U.S. Pat. No. 4,406,079 discloses a magazine for propellent charges, and hammer driving tools are shown in U.S. Pat. No. 4,252,259. Related patents disclose power-driven fastener means, such as shown in the U.S. Pat. Nos. 4,068,790; 3,688,964; 3,554,425; 3,499,590; 3,552,625; 3,494,532; 2,252,259; and 4,406,079. These are examples of the prior art and state of the art type of devices relating to the field of invention for the power actuated tool of this current design.

It is, therefore, the principal object of this invention to provide the combination of a novel method for indexing of a cartridge strip through a tool or apparatus for repeat driving of fasteners into hardened surfaces, and to employ in conjunction with it a novel magazine feed that assures convenient and accurate alignment of each fastener in preparation for a subsequent firing.

Another object of this invention is to provide a uniquely designed magazine feed that is streamlined in its mounting within the fastener driving tool of this invention, but yet highly accurate in its delivery of fasteners repeatedly into position for driving into a work surface.

Still another object of this invention is to provide means for providing some closure to the chamber in which the next fastener is positioned for driving so as to assure accuracy in the manuevering of the fastener during its driving into a construction surface, but likewise, provide some safety to the user of the instrument.

Yet another object of this invention is to provide a unique break means operating principally under that pneumatic pressure developing within the tool during its firing, and which is designed to provide for a very controlled and precise regulation of the degree of pressure exerted upon the fastener during its driving into a construction surface.

Yet another object of this invention is to provide means for setting of the tool for a firing which requires a force greater than that normally exerted by the human hand, etc., in order to position the cartridge into proximity with its driving piston in preparation for cartridge ignition.

Still another object of this invention is to provide a lateral feed under indexing arrangement for advancement of a cartridge strip generally laterally through a fastener driving tool.

Another object of this invention is to provide various carriage means operating in conjunction with an indexing wheel for providing the automatic resetting of a cartridge strip within a fastener driving tool in preperation for immediate subsequent applications.

Yet another object of this invention is to provide for the incorporation of a particle attractor within the structure of a fastener driving tool and which functions to attract debris and exhaust exiting from the apparatus during a firing, accumulates the debris therein, dampens the sound of the firing, and provides a convenient hand gripping means for facilitating the stable hold of the apparatus during its usage.

Still another object of this invention is to provide a fastening driving tool which incorporates various cushioning means which add to the facility and comfort in usage of the tool, and likewise dampens the impact from recoil of the apparatus during its usage.

Yet another object of this invention is to provide a cartridge feeding indexing mechanism that aligns each cartridge in contiguity within the firing chamber in preparation for the explosive driving of a fastener, while preventing the rearward or lateral discharge of any forces of combustion generated during a firing procedure.

Still another object of this invention is to provide a fastener driving tool that is fabricated from approximately six major and integrated components, which can be very easily dissasembled, with just a single or two tools, to facilitate the servicing and cleaning of the device during and subsequent to its application.

These and other objects will become more apparent to those skilled in the art upon reviewing the summary of this invention, and upon undertaking a study of the description of its preferred embodiment, in view of the drawings.

SUMMARY OF THE INVENTION

This invention is concerned with the formation of a power actuated tool for driving fasteners, one in which the driving means, namely the cartridges incorporating explosive force, are indexed through the apparatus during its functioning, so as to add the element of automatic operation to the device, and likewise, affords the advantages of magazine feed, of various fasteners, one after another, sequentially into position for being driven by means of the tool generated force into a construction surface of hardened materials, such as a concrete wall, or floor, a metal structure, or the like. Generally, the tool is fabricated from a series of complex and uniquely shaped components, but which are conveniently assembled into approximately six basic structured components, that are easily assembled, or dissembled, the latter generally only occurring when servicing or cleansing is required. More specifically, the device is designed, when assembled, for providing a totally automated tool, that can readily provide for repeat performance during its application, as foresaid, with even the series of fasteners to be driven by the tool being provided through mounting on a carrying strip ready for installation within an automated magazine feed for their delivery sequentially to that part of the instrument which derives them into the high density surface, as previously explained. More specifically, the basic components include a handle means, and which incorporates the various indexing means for feeding of the cartridges into position for alignment for firing of the tool, in addition to incorporating the firing mechanism which achieves an ignition of the cartridge during tool application. Forwardly of the handle means is a tubular cylinder which incorporates a reciprocating piston therein, and which is generally designed for being set up for propulsion within a rearward segment of the cylinder means, but, during a firing, is thrusted forwardly under excessive forces generated from an igniting cartridge for driving of the fastener sufficiently and stably into the structured supporting surface, of the type as just previously explained. The tubular housing or cylinder means is designed for snug mounting upon the handle means for the invention, and the handle means is conveniently shaped for facilitating its grasping and holding by the operator, as during its usage, in order to add to the ease of application of the device, but likewise, to provide significant cushioning, in order to absorb any recoil that an operator would repeatedly be subjected to under normal operating conditions, particularly when repeat usage of the tool is made. In addition, the handle means is of a utilitarian shape, having a cavity therein, and which is closed by means of a cover, and more specifically one constructed of a cushioning material, which when applied to the stock or rear end of the tool not only provides a means for retention of a any servicing tool within the handle cavity, but likewise, provides that cushioning for the operator against any impact or recoil, as previously explained, experienced by the instrument, and its user, during a firing. Another segment of the apparatus, as briefly alluded to, includes the feed housing mechanism that conveniently and uniformly is rigidly applied onto the handle means, and just rearwardly integrated into the structure of the tubular housing, and which is designed to provide for the enhanced attributes of this invention in furnishing and indexing means useful for providing for the horizontal or lateral shifting transversely, although vertical is not out of the question, of a cartridge strip, in the nature of a magazined series of cartridges, as through the apparatus for repeat firings, during constant usage of the tool. The indexing means includes an indexing wheel, generally of circular design, having a series of toothed segments and surface gears which cooperate with other mechanism for assuring the precision indexing of the cartridge strip, one step at a time, during repeated usage of the apparatus. The indexing wheel cooperates with a carriage, which is responsive to the operating components within the tubular housing, namely, the barrel cylinder means, so that as the tool is pressured against the structural surface in which the just loaded fastener is to be driven, the cartridge strip is automatically indexed, one cartridge at a time, so as to move the spent cartridge to the side, for eventual disposition, while relocating in precision alignment of the next cartridge for loading into proximity within the piston cylinder combustion chamber, for ready firing upon the squeeze of the trigger means of the handle once the tool is set.

Another feature of this device includes the magazine means which is uniquely designed for holding a significant number of fasteners in convenient alignment within its supporting strip, and generally approximately twenty of such fasteners will be arranged through their location within their supporting strip, located within the magazine means of the device, and ready for feeding sequentially, one at a time, into alignment within the fastener chamber for ready driving by the piston rod instrumentation operatively associated with this device, and which is thrusted forwardly, during a firing. The magazine means interconnects between the upper forward frontal end of the device, at that position where the fastener means needs to be located in preparation for a firing, while the magazine means is angulated downardly, towards the rear, and interconnects with a brace extending from the bottom of the handle for the tool, so as to readily provide a very conveniently located magazine means that has significant length so as to accommodate the variety of numbers of fasteners as previously explained, but likewise, add to the pleasing appearance of the device during its usage, and furthermore, increases the structural rigidity and strength of this device, due to the magazine means being rigidly fastened at two locations, proximate its both ends, as integrated into the structure of the tool of this invention.

Another feature of this invention includes a brake means that is structured into and forwardly of the tubular housing for this device, and which brake means is uniquely designed for receiving an absorbing the pneumatic pressure that is generated within the tubular housing, as its piston is thrusted forwardly, during a firing, and which pneumatic pressure is designed for functioning as a cushion to dampen the terminal thrust of the piston as it reaches the fullest extent of its driving stroke when moving a fastener into a surface. For example, without such a brake means, the piston may drive the fastener too far, or encounter impacting forces at the end of the drive which, after repeated usage, may cause a deterioration, if not destruction, of the instrument after sustained usage. But, by incorporating a uniquely designed brake means of this invention, it has a tendency to cushion that final thrust, as previously explained, so that the tool operates without encountering unneeded impacting forces, thereby dampening them, absorbing them through the functioning and operations of such a pneumatic braking means, as designed into this invention.

Another feature of this invention is a conveniently arranged and located guide rod means which has a tendency to shift the piston means into proximity with the emplaced cartridge, in preparation for a firing of the tool, and likewise, provides means for furnishing a degree closure and support at that location where the next fastener has been shifted and arranged into alignment with the frontal end of the piston rod, to assure that the fastener means is properly stabilized into position for a driving, that accurate driving of the fastener is assured, and to generally reduce the discharge of any pressure, or other deleterious particles, at that location where the piston rod encounters the back end of the fastener, as against its head, during a driving function, so as to prevent any injury to the user of the tool, or anyone in proximity therewith.

Preparation of the fastener driving tool of this invention for subsequent and repeat firings can be easily performed, by simply inserting the cartridge magazine strip into position within the instrument, just forwardly of its indexing means, and into alignment with the firing chamber for the tool, and likewise, installing a strip of the fasteners into location within the magazine feed for the device, with the uppermost fastener being shifted into alignment within the driving chamber, axially of the frontal end of the piston rod, in preparation for a firing. When this achieved, all the operator need do is simply forcefully apply the entire instrument against that surface into which the fastener is to be driven, thereby providing for a rearward shifting of its guide rod means, for achieving that locating of the next cartridge into position within its firing chamber, and likewise, to afford some closure to the fastener located chamber as previously summarized. Under this condition, the fastener is readily in alignment for driving, and likewise, the barrel cylinder means of the invention and its rearwardly directed combustion chamber pressed conveniently against the next cartridge, which will have just previously come into alignment with its combustion chamber, and all the operator need do at that time is to simply squeeze the trigger, and achieve a firing of the apparatus, thereby thrusting its internally arranged piston forwardly, for driving of the fastener deeply into the type of structure as previously explained through usage of the instrument of this invention. And, upon completion of that function, the indexing means of this invention will conveniently shift the next cartridge into position for firing, moving the just fired or spent cartridge laterally to the side, generally out of the instrument, and likewise, the magazine feed, which incorporates a spring biasing means that pressures against the strip of fasteners, will shift the next fastener upwardly into alignment within the fastener chamber, since the chamber will become opened, as the tool is removed from the wall in which a fastener has just been driven.

BRIEF DESCRIPTION OF THE DRAWINGS

In referring to the drawings, FIG. 1 is an isometric view of the power actuated tool with magazine feed of this invention;

FIG. 9 is a back view of the handle means segment of the invention, as shown in FIG. 4;

FIG. 10 is a left side view thereof;

FIG. 11 is a underside view of the upper feed housing segment of the invention;

FIG. 12 is an inverted left side view thereof;

FIG. 13 is a bottom view of the lower feed housing component of the invention;

FIG. 14 is a sectional view of the upper feed housing taken along the line 14—14 of FIG. 11;

FIG. 15 is a left side view of the lower feed housing shown in FIG. 13;

FIG. 16 is a front view of the lower feed housing shown in FIG. 13;

FIG. 17 is a sectional view of the upper feed housing, and more specifically showing the indexing wheel shaft, taken along the line 17—17 of FIG. 11;

FIG. 18 is a top view of the tubular housing segment shown in FIG. 3;

FIG. 19 is a front end view thereof;

FIG. 20 is a longitudinal sectional view of the tubular housing segment shown in FIG. 18;

FIG. 21 is a side view of the particle attractor as also shown in FIG. 3;

FIG. 22 is a front view thereof;

FIG. 23 is a sectional view of the particle attractor taken along the line 23—23 of FIG. 21;

FIG. 35 is a top view of the left side cover for the fastener magazine means for this invention;

FIG. 36 is an inside view thereof;

FIG. 37 is an interior view of the right side cover for the magazine means;

FIG. 38 is a top edge view thereof;

FIG. 39 is a lower end view of the left side housing, as taken along the left end of FIG. 35;

FIG. 40 is a lower end view of the right side housing as taken along the left end of FIG. 38;

FIG. 41 is an interior view of the handle cover, as shown in FIG. 4;

FIG. 42 is a left side view thereof;

FIG. 43 is a sectional view of the handle cover taken along the line 43—43 of FIG. 41;

FIG. 44 is a sectional view of the handle cover taken along the line 44—44 of FIG. 42;

FIG. 45 is a side view of the fastener means holding strip, such as previously shown in FIG. 2, and disclosing, in phantom line, one of the fasteners held thereto;

FIG. 46 is a front view thereof;

FIG. 47 is a front view of the magazine feed shift plate, as also shown in FIG. 8;

FIG. 48 is a side view thereof;

FIG. 49 is a top edge view thereof;

FIG. 50 is a top view of the guide plate and spring holding means for the magazine feed, as shown in FIG. 8;

FIG. 51 is a side view thereof;

FIG. 52 is a back view thereof;

FIG. 53 is a front view of a bolt means;

FIG. 54 is a side view thereof;

DESCRIPTION OF THE PREFERRED EMBODIMENT

Figure 2:
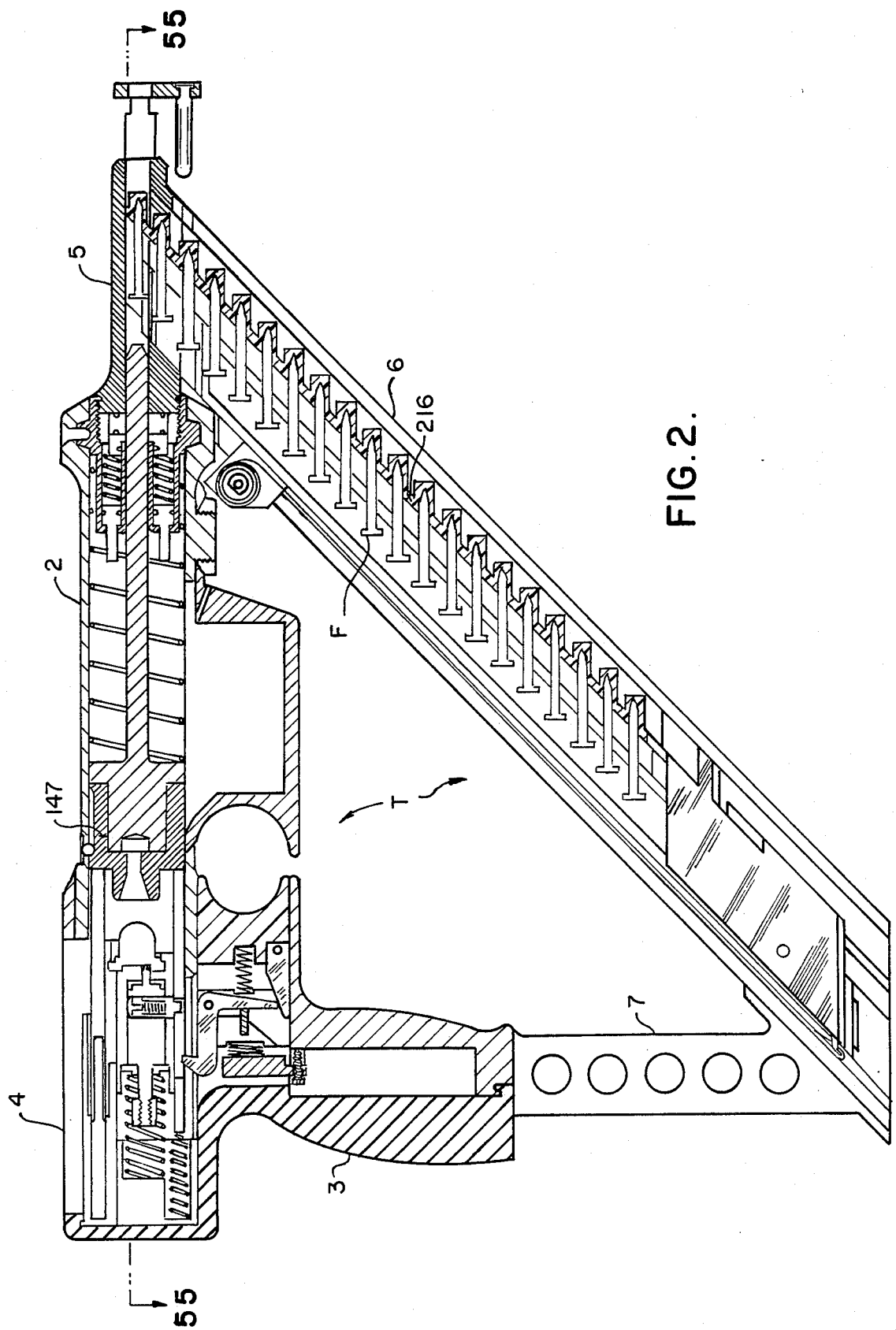
FIG. 2 is a side view thereof, showing in section the entire internal structure of the said tool.

In referring to the drawings, and in particular FIG. 1, the powder actuated tool of this invention, and incorporating its magazine feeding mechanism is shown in an isometric view. As can be seen, the tool T includes a series of interengaging components, which when assembled together into the final form, perform the function of providing for the automatic driving of a series of fasteners, in sequence, into a supporting material or surface, such as those previously identified, through the usage of the powder loads that are laterally fed, also automatically and sequentially, into the apparatus during its loading. As can be noted, the apparatus includes a housing assembly 1, which may be more aptly described as a barrel or tubular housing component 2 for the overall apparatus. This particular tubular housing or cylinder assembly 1 mounts onto the handle component 3, and is rigidly fastened thereto, in the final assembly. This handle means, as can be obviously seen, provides a convenient gripping area for holding of the tool during its loading and application for driving a fastener into a supporting or base material, as previously summarized. Mounted onto the upper edge of the handle means portion is a feed housing segment 4, and which comprises the mechanism in which the strip of cartridges is laterally fed, at least in this embodiment, into and through the apparatus in preparation for its usage, during firing, and for carrying the spent cartridges away for disposal. In addition to the foregoing, there is a forwardly disposed, but integrated for operation, fastener means support housing 5 that cooperates to provide for emplacement and location of each fastener in preparation for its driving, generally operatively associated with the forward portion of the tubular housing 2. Extending downwardly from the fastener housing 5 is the magazine feed means 6, which is inclined rearwardly, as noted, and interconnects with a bracing 7 for stable mounting to the bottom of the handle means 3, as can be noted.

The relationship of these various components together, and a disclosure of the various operating components of this tool, are more aptly shown in FIG. 2, with each discrete component eventually being explained in detail, and how they cooperate together to provide for a totally automated operating power actuated tool for driving fastener means.

Figure 3:
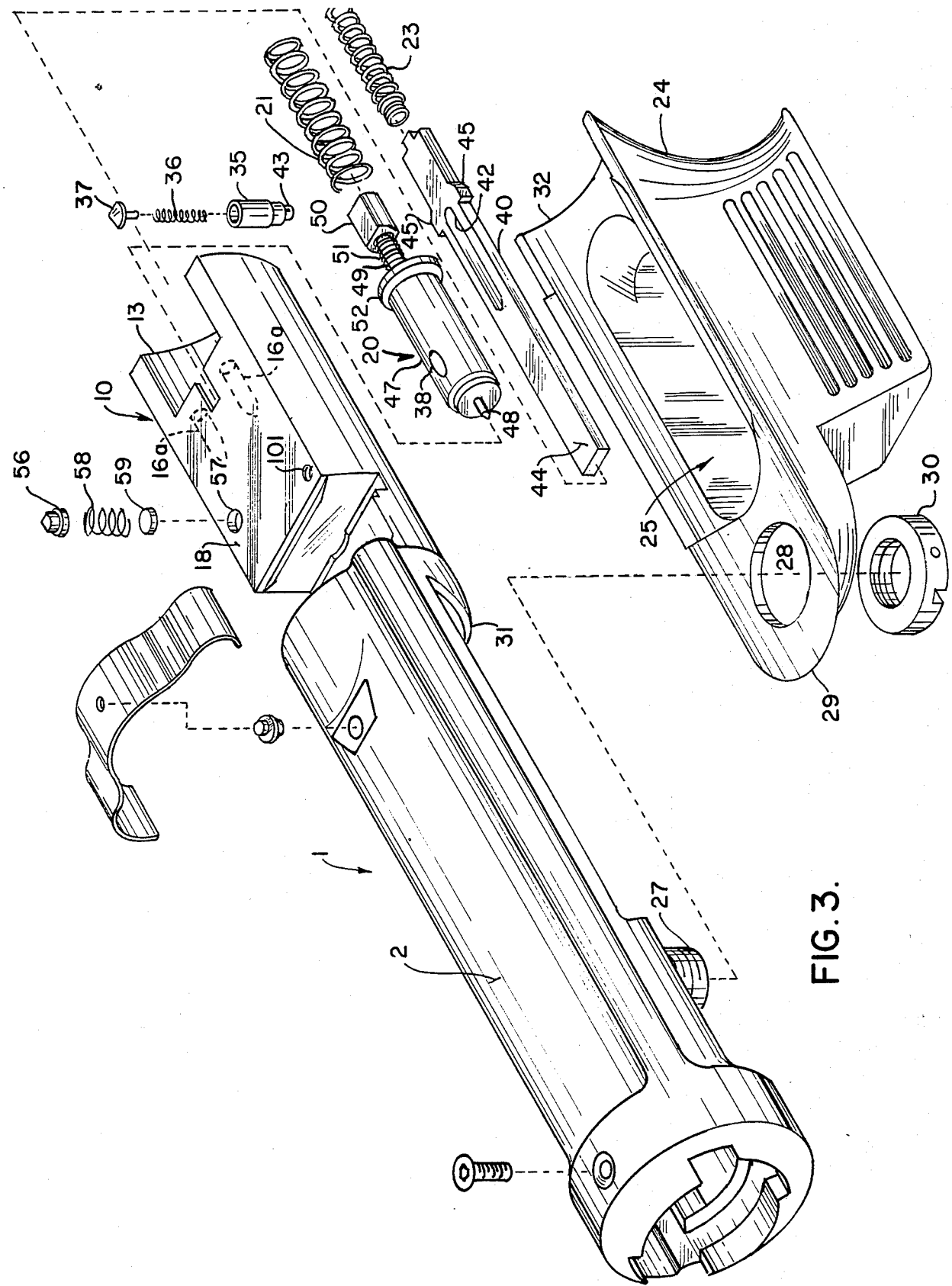
FIG. 3 is an exploded view of the tubular housing or cylinder segment of this invention.
Figure 4:
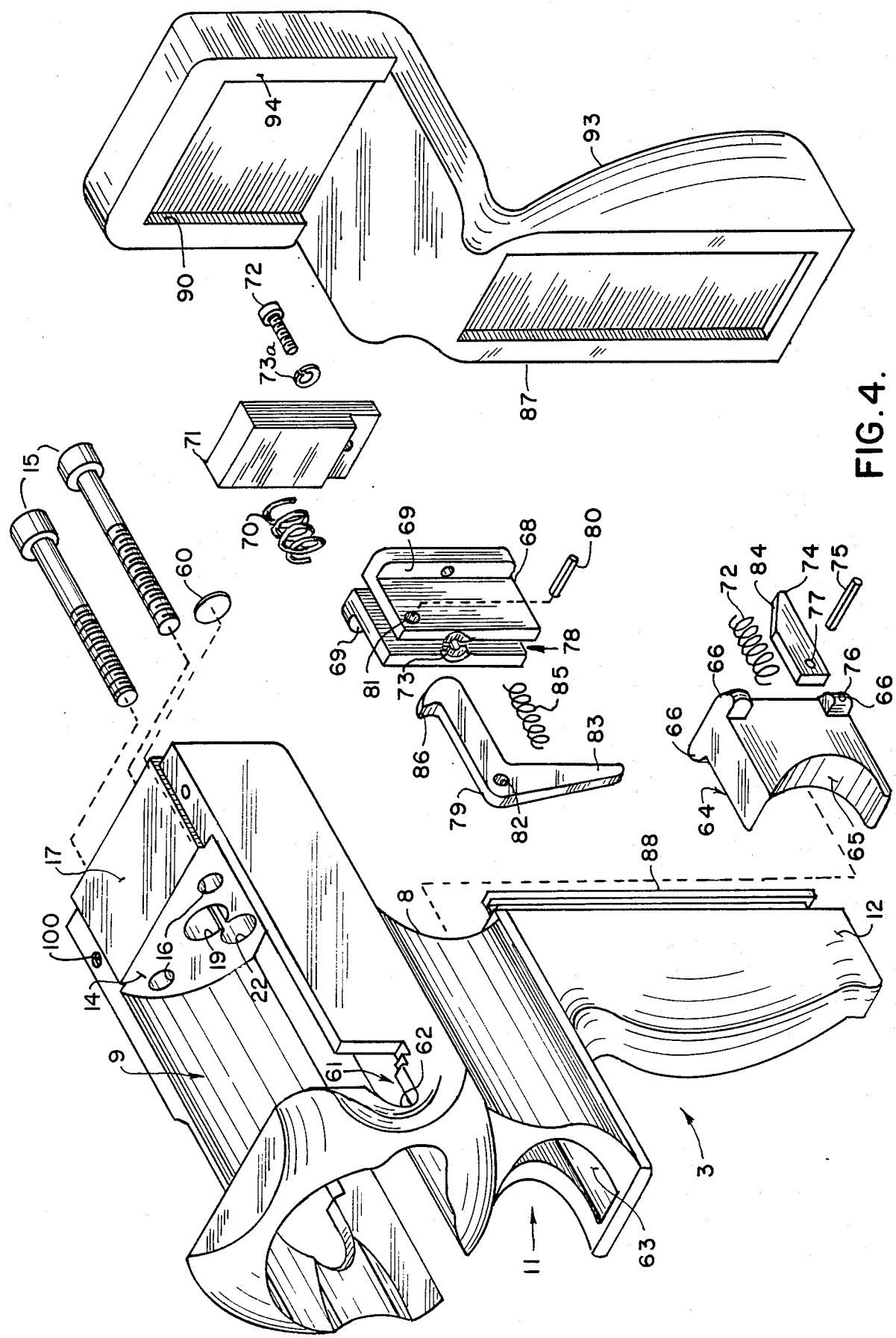
FIG. 4 is an exploded view of the handle means segment of this invention.

The handle means assembly for this invention is more aptly disclosed in FIG. 4, and generally contains operative components which are explained in greater detail in our co-pending application having serial No. 800,610, but the various components generally included comprise the base handle means structure 8, which includes a substantial opening therein, as at 9, and into which the back end of the tubular housing surface structure 10, or feed housing support, (FIG. 3) inserts during tool assembly In addition, the handle portion 8 includes its trigger mechanism housing 11 and a downwardly depending handle 12, as noted. Obviously, the handle 12 is provided for, and is significantly shaped, for ease of grasping by the hand, and it provides stable support for the apparatus during its firing and usage. Furthermore, the handle means 3 has its shaped aperture, as at 9, and it is through this particular aperture that the feed housing mechanism 10 complimentary fits, as explained, with the back edge of the feed housing mechanism 10, as along its surface 13 becoming disposed for snug resting against the internally arranged surface 14 where it is held in position by means of the threaded fasteners 15 each of which respectively inserts within its counter bored holes 16, for threaded engagement within the tapped apertures, as at 16a, provided within the back end of the feed housing support 10, as previously explained. This is the sole means for tightening of the handle means 3 to the feed housing mechanism 10, and for that matter, also to its tubular housing 1, as previously explained. When the handle housing 8 is assembled or has affixed therein the feed housing support 10, the upper surface 17 of the handle means, and that stepped upper disposed surface 18, of the feed housing 10, as can also be seen in FIG. 3, are flush with respect to each other. In addition, a counterbore 19 is provided within the surface 14, of the handle means, and this counterbore is formed in alignment of the firing pin mechanism 20 (FIG. 3) and actually functions as a back seat for the firing pin spring 21, as noted. In addition, a second counterbore 22 is provided into the surface 14, and functions as a back mount for the push rod spring 23, as noted.

The tubular housing assembly 1 is thoroughly disclosed in an exploded view, in FIG. 3, showing all of its component parts as integrated into the assembly before it is mounted within the structure of the overall tool or apparatus, or fixed in combination with the handle means 3, as previously explained. As can be seen, the tubular housing assembly includes its housing 2, which includes a tubular shaped housing component at its front end, as noted, and which has integrally formed at its rearward end, as at that portion 10, the support for the feed housing means 23, and which latter means functions as the transfer means that receives the shifts the cartridges through the tool, during its usage, as previously summarized, and provides for an automatic lateral feeding of the cartridge strip through the apparatus, during its application and usage. This has previously been reviewed in our co-pending application having Ser. No. 800,610.

Mounting onto the underside of the tubular housing portion 2 is the particle attractor and receptor 24. This attractor has an integral cavity of substantial size, as at 25, formed therein, and which is provided for accumulation of the spent powder, derived from the fired cartridges, as during repeated usage of this apparatus. The cavity 25 of this means 24 is in open communication with the interior, as at 26 (see FIG. 20) of the cylindrical shaped section 2 of the housing, and as the cartridges are ignited, and exploded for driving of a fastener, the spent powder and exhaust enters into and is accumulated within this cavity 25 of the particle attractor 24. Also, as can be seen in FIG. 3, there is a threaded stud 27, and it is designed for extending through the aperture 28 formed through the forwardly extending flange 29 of the attractor 24 and then affixed into position by means of the nut means 30. In order to conveniently and thoroughly mount the debris attractor 24 onto the barrel housing 2, said barrel housing has a wedge shaped slot, as at 31, provided at that junction between the said tubular barrel housing 2, and its integral support for the feed housing 10, and wherein the attractor, and its rearwardly disposed dovetailed portion 32, inserts for retention of said rearward edge of said member thereat.

In addition, the flange 29 of the debris attractor 24 complementary fits upon the threaded stud 27, as explained, and is thoroughly fastened in place by means of the application of the nut 30, which securely holds said debris attractor in place.

The integral feed housing support 10, at the back of the tubular housing assembly 1, as previously explained, is designed for reception of the firing pin mechanism 20, which, in application provides for the ignition of any cartridge for driving of a fastener when the apparatus is placed into usage. As can be noted, this particular segment of the housing has a stepped location, as at 33 (See FIG. 20), and it is upon this particular surface that the feed housing module of FIG. 5 mounts upon the assembly of the apparatus for usage. In any event, the housing support 10 has its series of internal chambers located therein, as previously explained, and into which the various firing mechanisms, such as the said firing pin assembly 20 locates, as during usage. There is a cavity 34 (FIG. 20) in which the firing pin assembly 20 inserts, and is normally held into position by means of the insertion of a sear 35, and its spring means 36, biasing the sear pin 37 upwardly into the aperture 38 formed through the firing pin mechanism 20, as also noted in FIG. 3. The sear pin and its sear means 35 are normally located within the cavity 39 formed through the bottom of the feed housing support 10. In addition, a push rod 40 is normally located within the rod chamber 41 provided longitudinally within the feed housing support 10, and which is in open communication with the said sear pin cavity 39. The push rod 40 has an elongated slot, as at 42, formed therein, as can be seen, and a pin means 43, integrally formed at the bottom of the sear 35, normally is located within said slot 42, as the apparatus is being recocked for further operation. But, during firing, as can be understood, a sear lever means, to be subsequently described, normally pushes upwardly upon the pin means 43, to lift the sear 35 upwardly and free from the said push rod 40, as when the apparatus is in the incipient stage of firing. As can be understood, when the sear means pin 43 is released from the push rod 40, it is then in conjunction with the firing pin housing 20 propelled rapidly forwardly, through the effort of the firing pin spring 21, and as that occurs, the sear pin 35 does slide forwardly upon the upper surface, as at 44, of the push rod 40. But, when resetting of the apparatus for refiring, as when its piston rod means, to be subsequently described, is urged rearwardly, through various operating components, at the time the spring means 23 of the push rod biases against the back end of the push rod 40, for urging it forwardly, until such time as the sear pin lower protrusion 43 re-enters the push rod slot 42, as noted. It should also be commented that the push rod 40 includes a pair of tangs 45, and these tangs are provided to function as a stop, against the sides of the channel 39, so as to prevent the push rod from entering too forwardly within the feed housing support 10.

As can also be seen in FIG. 20a, in addition to FIG. 20, the bottom of the feed housing 10 incorporates a slot 46 therein, and it is through this particular slot that the sear lever, to be subsequently described, inserts during firing of the apparatus, and more specifically for lifting of the sear pin stem 43, as explained.

The firing pin mechanism 20, as previously explained in FIG. 3, includes its housing 47, having that aperture 38 provided therethrough, and into which the sear and sear pin 35 and 37, respectively, insert, for reasons as previously explained. The front of the firing pin housing 47 has an integral protrusion 48 provided thereon, and this naturally comprises the firing pin that impacts the cartridge upon firing, as can be readily understood. The back end of the housing 47 has an integral stem 49 extending rearwardly therefrom, and incorporates a shoulder means 50, with a spring 51, located upon said stem 49, and biasing against a washer 52 that normally rests against the back edge of the firing pin housing 47, as can be seen. The spring 21, as can be noted, locates upon or over the stem 49 and the shoulder 50, and strongly biases against this washer 52, and is useful for thrusting the firing pin housing, and its firing pin 48, forwardly, upon triggering of the apparatus during a firing. As this occurs, since the washer 52 is of a slightly greater diameter than the firing pin housing 47, the firing pin housing 47, and the remaining components of its mechanism, are free for continued forward riding within the cavity 34, formed within the feed housing 10, as previously explained, but the washer 52, as stated, being of a slightly greater diameter, impacts rather abruptly against the shoulder 53 (FIG. 20) formed within the chamber 34, so as to prevent any further forward movement of the washer 52, but due to the high forward momentum provided to the firing pin mechanism 20 during a triggering, the housing 47, and its pin 48, yet continue to move slightly forwardly, during firing, so that the pin 48 can impact against the back of any cartridge located within the combustion chamber, to initiate its ignition and firing of the apparatus. But, that forward momentum is immediately retracted, after firing, due to the spring 51, and the housing 47 returns back to the washer 52, so that the firing pin 48, or more specifically its forward tip, becomes flush with, or slightly withdrawn within, the surface 54 of the cartridge clearance path, as at 55, formed integrally and laterally through the feed housing means 10, as where the cartridge strip passes therethrough, as can be noted, most specifically, in FIG. 20. Also, as can be seen in FIG. 3, there is an indexing feed stop 56, that is located within an aperture 57 provided through the feed housing 10, and this particular stop incorporates a spring means 58 and a plug 59, with a portion of the stop 56 extending upwardly, and which is useful for limiting the operations of the indexing means which provides for automatic setting of the next cartridge after a firing, as will be subsequently described.

Figure 20A:
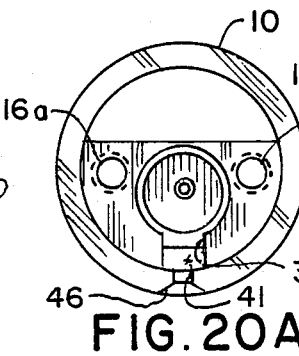
FIG. 20A is a back view of the tubular housing segment shown in FIG. 18.

In addition, as can be noted in FIG. 20a, there are those pair of tapped holes, as at 16a, and which are provided for reception of the fasteners 15 for holding the handle housing, all as shown in FIG. 4, to the feed housing support 10, as shown in FIG. 3, as defined.

Returning once again to FIG. 4, and the handle means mechanism 3, the counterbore 19 is provided within that surface 14, of the handle means, and this counterbore is formed in alignment with the firing pin mechanism 20, and actually functions as a back seat for the firing pin spring 21, as previously explained. In addition, that second counterbore 22 is provided into the surface 14, and functions as a back mount for the push rod spring 23, as also previously defined. In practice, the formation of these counterbores has provided rather difficult, and therefore, to form it, a hold is drilled at the vicinity of the counterbore 22, and a plug 60 is press fitted into position at the back end of the formed aperture 22, to form the desired counterbore, and spring seat.

It can also be noted in this FIG. 4 that the handle housing 8 also discloses its clearance slot, as at 61, and which is formed in alignment with the related clearance slot 55 of the tubular housing, as previously explained, so as to provide for the convenient lateral feed and movement of the cartridge strip C, through the apparatus, during its repeated usage. The back of this clearance slot is rectangularly shaped, for snug reception of the cartridge strip therein and for its lateral movement through the tool during usage. Although, it may be commented at this time, that the clearance slot does provide the forwardly shaped cavity portions, as at 62, and which conveniently provide sufficient clearance for the casing portion of the cartridges, as they are automatically laterally fed through the tool, as during application.

Downwardly of the handle housing 8 is that trigger housing portion 11, as explained, and which provides for the convenient location of the triggering mechanism for this tool during firing. For example, the trigger housing incorporates an integral chamber, as shown at 63, therethrough. A trigger 64 conveniently fits within the cavity 63, and has an arcuate or concaved frontal portion, as at 65, formed forwardly thereof, and for the convenient grip by the index finger upon firing of the apparatus. To provide for a reduced frictional sliding of the trigger 64 within its casing 11, a series of integral tabs 66 extend laterally from the trigger, and are disposed for reduced contact with the sides of the cavity 63, so as to facilitate the movement of the trigger by the finger as discharge of the apparatuses performed. In also referring to FIG. 9, the chamber 63 incorporates a series of lateral slots 67 in which the trigger tabs 66 conveniently locate, but these slots terminate at the frontal portion of the trigger housing, so as to provide a stop against which any further forward movement of the trigger, within the handle housing, can occur. Obviously, the trigger 64 is inserted into the chamber 63 through its back opening. Also provided for locating within the trigger chamber 63 is a holder 68, which includes a pair of rearwardly but integrally formed flanges 69, with said holder 68 fitting within the chamber 63, at its back end, and which has biased against it a spring means 70 and a locating plate 71, which is held firmly in position by means of a threaded fastener 72 and its washer 73a, that firmly threadily engages into the proximate back end of the handle portion 8. This positions the holder 68 into location, and also locks the trigger mechanism 64 into position. A spring 72 biases against the back surface of the trigger 64, and conveniently fits within a segmented counterbore, as at 73, provided at the front edge of the holder 68, for conveniently and continuously biasing of the trigger 64 forwardly, and for exposure through the forward end and extending out of the chamber 63, as noted in this disclosure. Also, as can be seen, there is a wedge shaped member 74 that fits within a slot formed (not shown) at the lower back edge of the trigger 64, and a mounting pin 75 is pressure fitted within the apertures, as at 76, through the lower trigger tab 66, and also mounts through tee aperture 77 provided through the wedge 74, for firmly securing the member in place and to become an integral part of the trigger 64. This wedge 74 has clearance for moving into the bottom of the slot, as at 78, formed through the holder 68, as can be seen. Mounted within the holder 68, for pivotal movement therein, is a trigger lever 79, being held for pivotal movement within the holder 68 by means of the pin 80 which likewise pressure fits within the apertures 81, for pressure fitting therein, while also loosely inserting through the aperture 80 to effect the pivotal mounting of the said trigger lever 79 therein. Thus, as can be seen, the trigger lever incorporates a downwardly extending leg 83, extending approximately towards the bottom of its holder 68, and which is positioned for being contacted by the trigger wedge 74, as upon its canted surface 84, for effecting pivotal movement of the 1 ever, as the trigger 64 is pulled rearwardly, in preparation for firing of the apparatus. On the other hand, when the trigger 64 is released, and its spring 72 biases it forwardly, a spring 85 connects with the trigger lever, and which spring mounts within the channel 78 provided within the holder 68, to effect a repivoting of its downward leg 83 once again forwardly, during a resetting of the apparatus. The spring 85, as can be noted, biases against the back edge of the downwardly extending leg 83 of the said lever. The rearwardly extending or upper leg of the trigger lever 79 has an upwardly extending triggering segment 86, and it is this particular segment that contacts against and urges upwardly, the protrusion 43 of the sear means 35, during firing, so as to lift it from its push rod 40, or more specifically its internal slot 42, during firing of the apparatus.

In order to provide a shield for these operating components, particularly at the back end of the handle means 3, and for sheltering against the back edge of the feed housing mechanism 23, there is provided a cushioning means 87, which is peculiarly shaped for snug fitting by means of snap clasping against the back end of these components, and which not only shields against the entrance of dust or other elements into the operating components of the apparatus, but likewise, affords further attributes, as to be explained. As can also be seen in FIGS. 41 through 44, the integral ribs 88 are provided around the perimeter of the handle 3, and are designed for engaging the retention of the integrally formed flanges 89 formed of the cushioning means 87. In addition, similar type of flanges, as at 90, are likewise provided at the upper segment of the cushioning means, and are useful for engaging onto similar type of ribs, as at 91 (FIG. 5), provided at the upper back of the feed housing as shown, and as will be subsequently defined. But, in addition, it can be noted that the handle gripping portion 12 of the trigger housing incorporates a sizable cavity therein, as at 92 (FIG. 9) and which cavity is useful for holding of various tools, such as small screw drivers, Allen or hex wrenches, or the like, that are useful for servicing of this tool, as necessary, when needed. Or, in the alternative, it is just as likely that spare cartridges could be located therein for storage, if desired. In any event, as can also be seen in FIGS. 40 through 41, the cushioning means is conveniently shaped, particularly at its downward segment, as at 93, to provide sufficient bulk to ease the gripping of the entire apparatus during its usage, and to cushion the hand against recoil, during firing of the apparatus, as during its usage. The upper segment 94 of the cushioning means is generally flattened in configuration, and it is designed as such particularly to provide an overlying coverage and closure to the various operating mechanisms disposed at the rearward segment of the upper handle means 3, in addition to providing overlying coverage for the feed housing mechanism 23, as explained.

Figure 5:
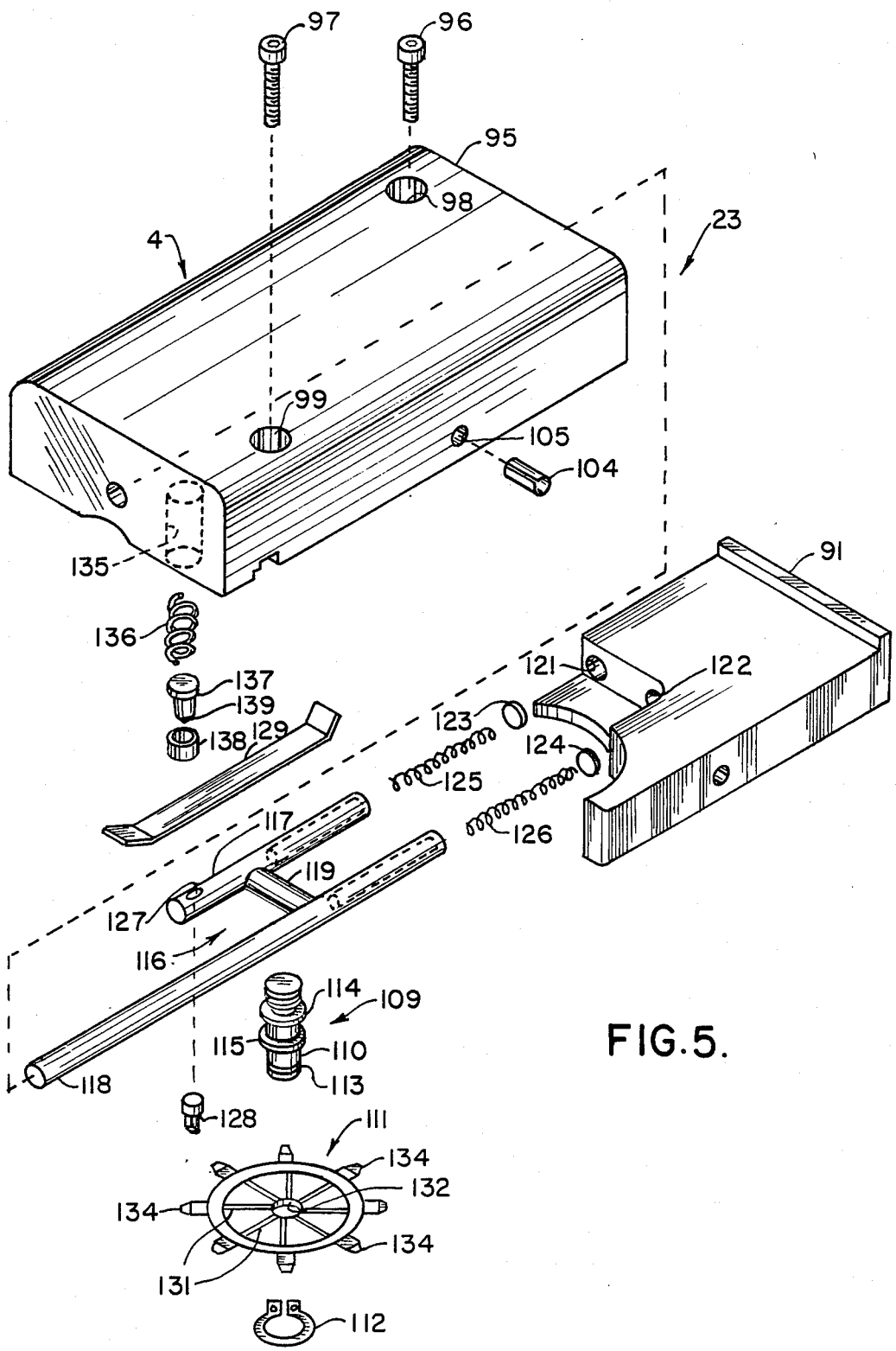
FIG. 5 is an exploded view of the feed housing segment of the invention.

The feed housing mechanism 23 of this particular invention is more aptly described in the exploded view as shown in FIG. 5. In addition, reference is made to FIGS. 11 through 16. This feed housing operates basically to provide the means for automatic shifting of the cartridge strip C through the apparatus, during continued usage and firing of the device while driving fasteners into their supporting surface. Generally, as can be noted, the feed housing incorporates a cover segment 95, and which is designed for flush mounting upon the aligned surfaces 17 and 18, of the handle means and housing support, respectively. And, as can be noted, when secured into position, a pair of threaded fasteners 96 and 97 respectively insert into and through their apertures 98 and 99 for securement within the tapped apertures 100 and 101, respectively, of the handle and feed support housing, as explained. In specifically referring to FIGS. 11 through 14, it can be seen that the cover means 95 includes a formed cavity 102, and into which a lower feed housing 103 conveniently inserts, and which is held into position by means of a tapered pin, as at 104, that inserts into the aperture 105 and into the hole 106 provided at the side of the lower feed housing 103, after the fastener freely inserts through the aperture 107 provided through the upper feed housing 23, as noted. The feed housing cover means 95, and the lower feed housing 103, provide the structural support for the various operating components that afford the automatic and lateral feed of the cartridge strip C through the apparatus, during usage. Generally, there is an indexing of this cartridge strip laterally through the apparatus, during its operation. Structurally, to achieve such, the cover means 95 incorporates a threaded or tapped aperture, as at 108, and into which a threaded shaft 109 permanently engages. The lower end of the threaded shaft 109 incorporates a shank portion 110, and onto which an indexing wheel 111 freely mounts, so as to provide for its indexed rotation during repeated usage and application of the apparatus. A snap ring 112 conveniently is snapped into position within an integral groove 113, formed proximate the lower end of the shank 110. At the midsection of the threaded shaft 109 are a pair of guides 114 and 115, the function of which will be subsequently analyzed. As can also be seen, there is a shuttle or carriage means 116 formed of a pair of legs 117 and 118, and which are integrally spaced apart by means of a lateral brace 119, as noted. The lower feed housing 103 incorporates a recess portion 120, and counter bored or drilled into this recess portion are a pair of apertures 121 and 122, as can be seen. For the convenience of manufacturing, these counterbores are actually formed by drilled holes extending through the lower feed housing 103, with their back ends pressure capped by means of the pressure plugs 123 and 124, to form the desired counterbore like structure for the housing 103. Designed for fitting within these counterbores 121 and 122 are their aligned springs 125 and 126, respectively, and which likewise are designed for reception into these counterbores are the back ends of the legs 117 and 118, as can be seen. Thus, there is a constant biasing forwardly of the carriage means 116, as can be determined. In addition, the leg 118 of the carriage means rides between the guides 114 and 115, of the shaft 109, and in conjunction with the brace 119, limits the forward shift of the said carriage means. Provided at the forward end of the leg 117 is an aperture, as at 127, and disposed for locating therethrough is a dog 128 which is continuously spring biased downwardly, by means of the leaf spring 129, which conveniently fits within its shallow cavity 130, formed within the interior upper surface of the feed mechanism cover means 95, as can be also seen in FIG. 11. As the carriage means 116 is longitudinally shifted, during operations of the device, it can be readily seen that the dog 128, or more particularly its downward edge, engages against the radially disposed ridges, or surface gears, as at 131, provided around the central aperture 132 of the said index wheel 111. Thus, each rearward shift of the carriage means 116 pulls with it its dog 128, and provides for an incremental indexing of the star wheel 111, to that dimension which provides for a lateral shift of the cartridge C segment, or until the next cartridge $C_1$, just adjacent to the just spent cartridge, comes into position aligned with the firing pin mechanism of this apparatus. Movement or shifting of the carriage means 116 will be subsequently defined, in explaining the method of operation of the apparatus, but it must be noted that the forward segment of its leg 118 inserts into and through a channel 133, provided through the forward portion of the cover means 95, with the forward edge of the leg 118 being disposed for contact with the housing sleeve 148 of this apparatus, for providing for this resetting of the cartridge strip C, after each time a firing occurs, in preparation for the next application of the apparatus.

It should be commented herein that the teeth 134 of the index wheel 111, during each indexing shift of the wheel through the operations of the carriage means 116, and its cooperating dog 128, are designed for engagement within the formed slots $C_2$ provided along the upper edge of the cartridge strip C, in order to provide for that definite shift of the strip laterally through the apparatus, to achieve that alignment for the next cartridge in preparation for firing of the apparatus. In addition, it is desired to provide for a firm positioning of the cartridge strip in position, once set by the index wheel 111, while a firing occurs, and this is achieved as follows. The cover means 95 has a counterbore 135 provided therein, and within the counterbore are located a spring means 136, and a positioning pin 137. A pressure fitted ring 138 snugly inserts within the counterbore 135, to permanently retain the said positioning pin, and its spring, in place. It is to be noted that the downward surface of the positioning pin 137 is convexly formed, as at 139, disposing a width comparable to the slots $C_2$ formed along the upper edge of the cartridge strip C. Thus, as the cartridge strip is fed laterally through the apparatus, the convex tip of the positioning pin 137 is designed for riding upon this upper disposed edge of the said strip, and to become positioned within an aligned slot $C_2$ disposed along the upper edge of the strip, and to hold the strip in position during the next firing of the apparatus. On the other hand, as the index wheel 111 indexes the cartridge strip C to the next position, the positioning pin 137 can conveniently bias upwardly against its spring 136, and ride along this upper edge of the cartridge strip C, until it falls into position within the next and adjacent slot $C_2$ of the said cartridge strip C. Thus, there is a reasonably firm fixation of the cartridge strip into position, during each firing of one of the cartridges $C_1$, as during repeated usage of the apparatus. It might be commented at this juncture that the cartridge strip C, as can be seen, includes a plurality of these aligned slots $C_2$, not only along its upper edge, but likewise, there are corresponding type of slots $C_2$ also formed along the bottom edge of each strip, and the purpose for this is for the convenience of the user, so that regardless how this strip may be inserted within the apparatus, there will always be a series of aligned slots provided along whatever upper disposed edge for the strip is inserted into the apparatus to align a slot with the said pin.

The index wheel 111 as shown in FIG. 5 also includes upon its bottom surface a series of shallow cavities (not shown), and for the following purpose. This has already been shown and explained in our co-pending application. As the index wheel 111 is indexed at the particular degrees, generally around forty-five degrees, or just short thereof, during each index, while the carriage means 116, and its log 128, may continue to move rearwardly, the dog 128 at about or slightly less than that forty-five degree turn clears its beveled surface gears 131, and therefore, there is need for precisely finally positioning of the index wheel 111 for its final setting of the cartridge strip C in preparation for firing. Hence, the shallow cavities as explained are sufficiently aligned with the respective index teeth 134, and as the index wheel approaches that approximate forty-five degrees shift, the positioning pin 56 (FIG. 3) rides into and finally sets at the lowermost position within each of the identified shallow cavity, next aligned therewith, so as to provide for that final setting of the index wheel, and its shifting of the carriage strip C, precisely into an alignment with the firing chamber, and firing pin 20, of the apparatus.

In addition to the foregoing, it might be noted that the interior lower surface of the feed housing cover means 95 is conveniently shaped, as at 140, to provide clearance for the rotating index wheel 111, and in addition, it can likewise be seen that there is adequate clearance of an annular nature, as at 141, of the lower feed housing 103, designed for a similar purpose.

The structural components for this tool as heretofore defined are generally quite similar in function and operation to the operating structure of the powder actuated tool as previously analyzed in our co-pending application having Ser. No. 800,610. The following description of additional structure that has been added into this improved device, is subsequently analyzed herein. Generally, these particular components are designed to add further automation to the operations of this device, so that not only is the cartridge strip and its ignition shells automatically fed into and through the tool during its functioning, but with this added structure, the fastener means themselves are automatically fed by a magazine into position and proper alignment with the cartridge chamber and piston rod of this development, so that all the operator need do is simply align the tool with the surface into which a fastener is to be driven, and push upon the tool to locate it into its proper place and resetting, and then achieve a firing of the same.

In FIG. 20, it was previously analyzed how the back portion of the tubular housing assembly 1 functioned in cooperation with the various feed housing mechanisms to achieve indexing, cartridge shift, firing pin adjustment, and the like. The frontal but integral structure of this assembly is formed as the tubular housing 2, as previously explained. This particular structure has its central channel 26 provided therethrough, with its lower portion designed for holding of the debris collector, as earlier defined at 24. When the feed housing mechanism 23 is located into position upon the surface 10, as previously reviewed, it abuts against the back edge, as at 142, of this tubular housing 2. The tubular housing upon its external lateral surfaces is integrally formed having a pair of internally arranged guide slots 143 and 144, which are designed for accommodating guide rods, as to be subsequently explained. These slots are formed within their respective integral structures 145 and 146, respectively, as shown in FIG. 18.

Figure 6:
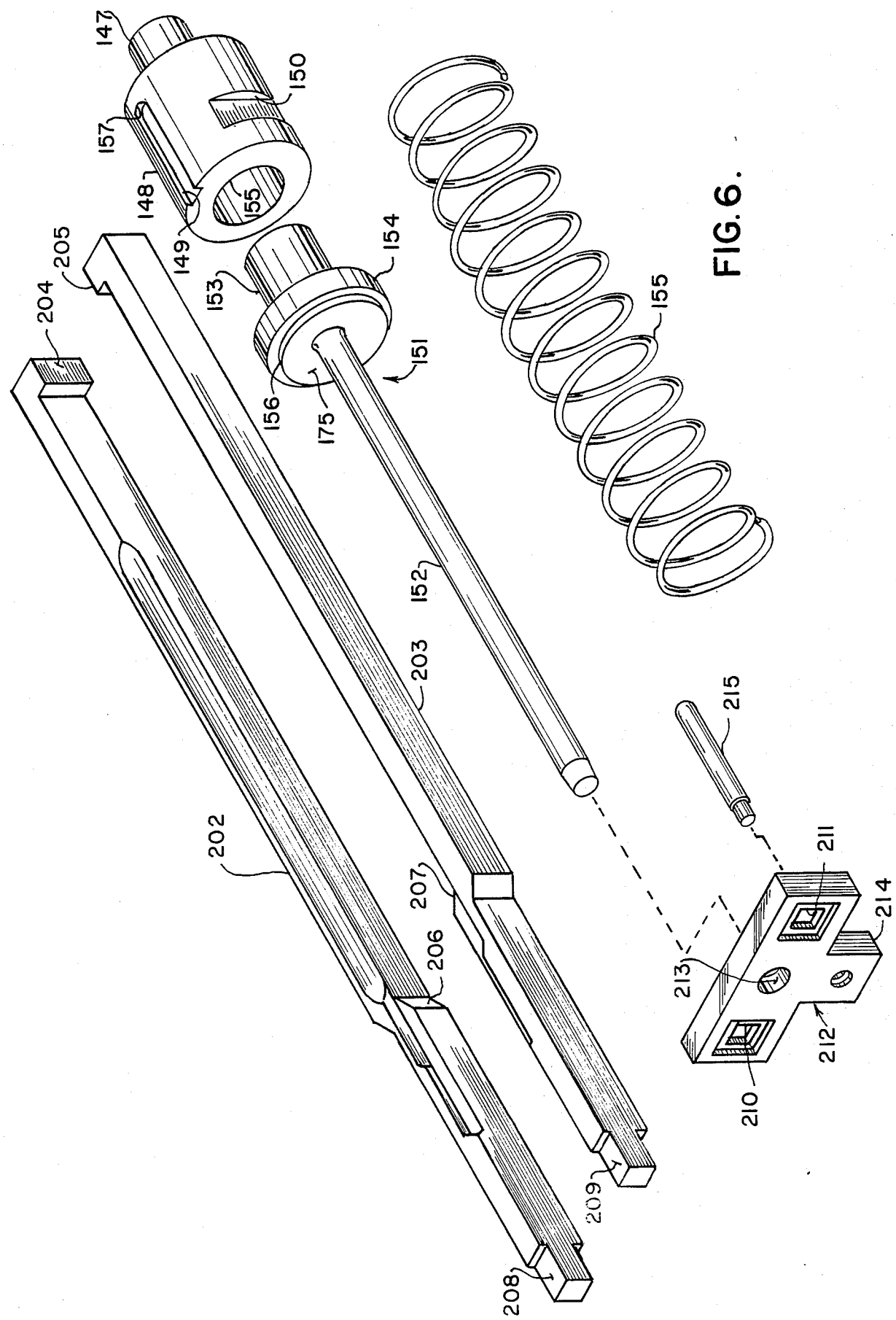
FIG. 6 is a partially exploded view of the firing piston rod, its cartridge housing mounting sleeve, the spring means, and guide rods, that are operatively associated with and within the tubular cylinder segment of this invention, as previously shown in FIG. 3.

FIG. 6 discloses the various components that generally insert within the tubular housing assembly 2. For example, the combustion chamber and cartridge positioner sleeve 147 provides a central cavity and channel therethrough and into which the next cartridge C becomes positioned in preparation for a firing. This sleeve integrally is formed with a more enlarged sleeve portion 148, which has an upper slot 149 of limited dimension and length provided therein, in addition to a pair of side formed cord like slots, one shown at 150, to either side of said sleeve. This sleeve fits into the cavity 26 of the tubular housing 2. Generally it rests proximate its rearward edge, as at 142, during functioning of this device. Also inserting within the cavity 26 is the piston rod 151, which includes its integrally forwardly extending rod 152, and its rearwardly extending enlarged portion 153 arranged rearwardly of the expansive washer like integral portion 154. The washer like portion 154 is designed for snug but sliding location within the channel 26, having a diameter only slightly less than its internal diameter of said channel. The rear portion 153 is designed for snug but sliding location within the cavity 155 formed of the housing 148. Thus, when the piston 151, and its housing 148, are located rearwardly within the tubular housing 2, they are generally in position for pressuring slightly further rearwardly through a forcing of the tool against a surface, as at the commencement of a firing, so that when a cartridge explodes, it thrusts the piston rod 151 rapidly forwardly, for driving of a fastener out of the tool and into its intended surface, and at the same time, the sleeve 148 remains reasonably stationary. The spring 155 also locates within the chamber 26, over the piston rod 152, and seats upon the stepped surface, as at 156, provided upon the forward and outer periphery of the washer like portion 154. Thus, the spring 155 continuously urges the piston rod assembly 151, and the combustion housing sleeve 148, normally rearwardly within the housing 2.

The upper surface of the housing 2, as can be seen in FIG. 18, has a threaded aperture, as at 156a, provided therethrough, and into said aperture locates a positioning pin which extends downwardly into the slot 149, of the combustion housing 148. The purpose for this is to provide a means for locating of said sleeve within the tubular housing, and since the spring 155 limits the extent of its forward shifting therein, the slot 149 prevents and stops, by means of its frontal edge 157, the combustion sleeve 148 from any further rearward movement. A cover means may clip over the positioning pin and clip upon the housing as shown in FIG. 3.

Figure 30:
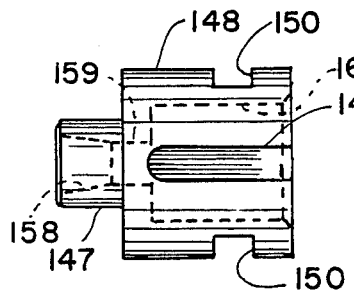
FIG. 30 is a top view of the combustion or cartridge chamber housing of this invention.
Figures 31, 32:
FIG. 31 is a front view thereof.
FIG. 32 is a back view thereof, showing the cartridge chamber.
Figure 33:
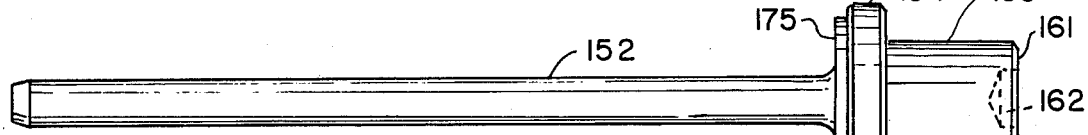
FIG. 33 is a side view of the piston rod drive means.
Figure 34:
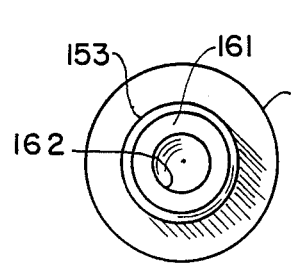
FIG. 34 is a back end view thereof.
Figure 55:
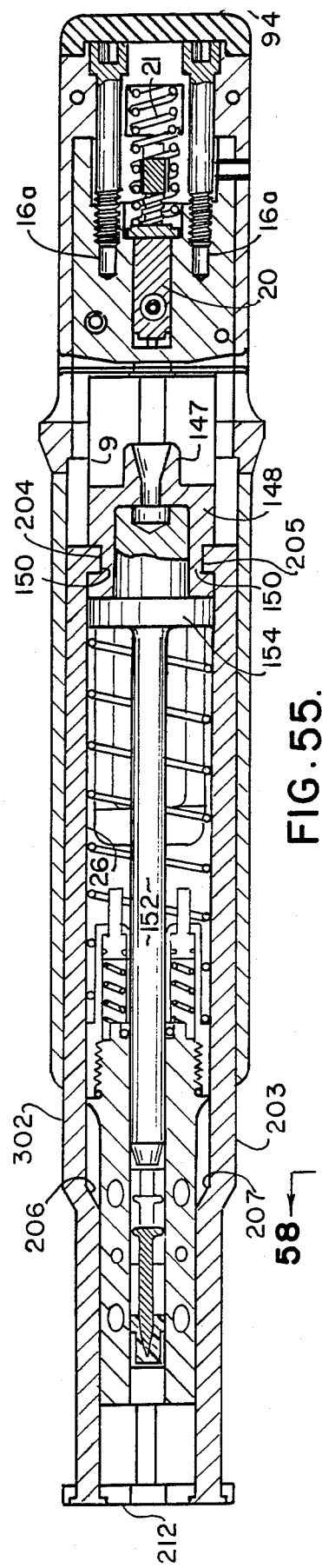
FIG. 55 is a horizontal section taken longitudinally through the tool generally along the line 55—55 of FIG. 2.
Figure 58:
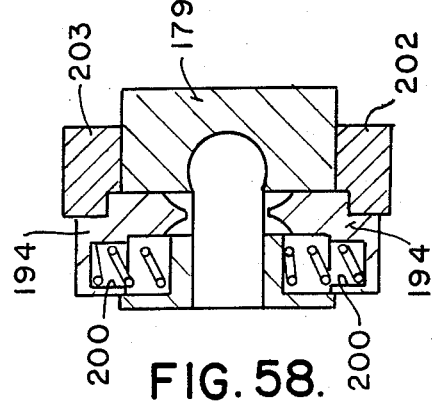
FIG. 58 is a sectional view taken along the line 58—58 of FIG. 56, showing the closure means for the housing.
Figure 59:
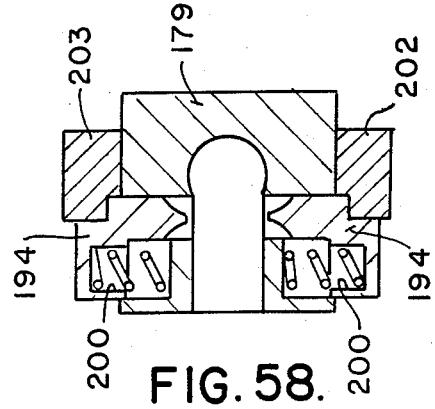
FIG. 59 is a an end view of one of the housing means closure plates, as shown in isometric in FIG. 7.
Figure 56:
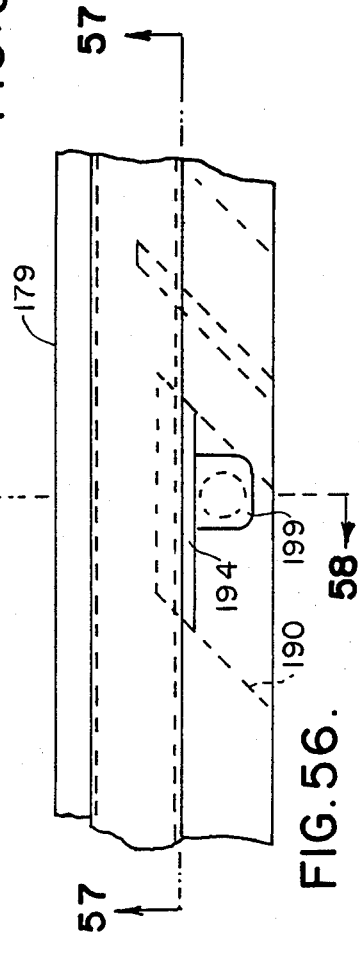
FIG. 56 is a side view of a portion of the fastener means positioning housing, generally as shown in FIG. 7.
Figure 57:
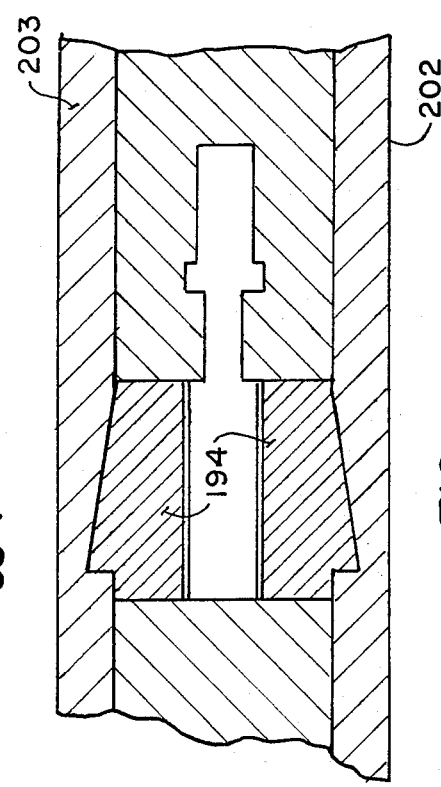
FIG. 57 is a longitudinal sectional view therethrough taken along line 57—57 of FIG. 56.

FIGS. 30 through 32 disclose in detail the structure of the combustion housing sleeve 148, its lateral slots 150, its upper slot 149, and its rearwardly extending combustion chamber 147, as previously explained. As can be seen, the internal combustion chamber 158 communicates by means of an opening 159 into the interior cavity 160 of the sleeve 148, which provides for its full exposure against the back end 161 of the piston rod assembly 151, as can be seen also in FIGS. 33 and 34. That back end 161 of the piston rod may include a shallow cavity, as at 162, therein, so as to provide a means for and capture of the combustion gases during an ignition to assure maximum thrust of the piston rod assembly 151 forwardly within the housing 2.

Figure 28:
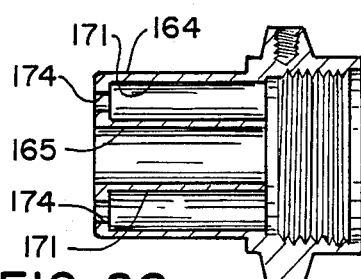
FIG. 28 is a longitudinal sectional view taken along the line 28—28 of FIG. 27.
Figure 29:
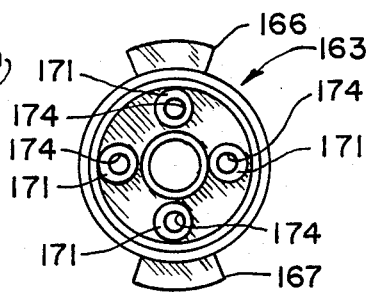
FIG. 29 is a front end view thereof.

Provided for fitting within the frontal end of the tubular housing 2 is the brake means housing 163 of the invention. (See FIGS. 7, 28, and 29.) It includes a rather cylindrical like structure, as at 164, having a central cavity 165 presented therethrough, and through which the frontal rod portion 152 of the piston rod moves, during its forward thrust. The housing includes a pair of flange like portions, as at 166 and 167, which are designed for conveniently fitting within corresponding and mating slots, as at 168 and 169 formed into the frontal enlarged portion, as at 170, of the tubular housing 2. The brake assembly housing 164 contains a series of counterbores contained therein, as shown at 171, there being approximately four in number, as can be seen in FIG. 29. Designed for fitting within each of these counterbores are a series of pressure pins, each as disclosed at 172, as in FIG. 7. Each of these pins incorporates a rearwardly extending stem, as at 173, and which are designed for extending rearwardly through the passages 174, for their significant distance, and designed for being contacted by the frontal surface 175 of the piston rod assembly 151, as the piston rod is reaching the forward most extent of its travel towards the front of the tool after a combustion. Each of these rods 172 has a slot, as at 176, formed thereon, and for accommodating an O-ring, or the like, so as to assure a fluidic seal at that location. Another seal means, as at 177, communicates with the front end of each of the rods 72, and are designed for accommodating a spring means 178, therewith, so as to normally bias the pins rearwardly within the tool, and with their respective channels 171.

Figure 7:
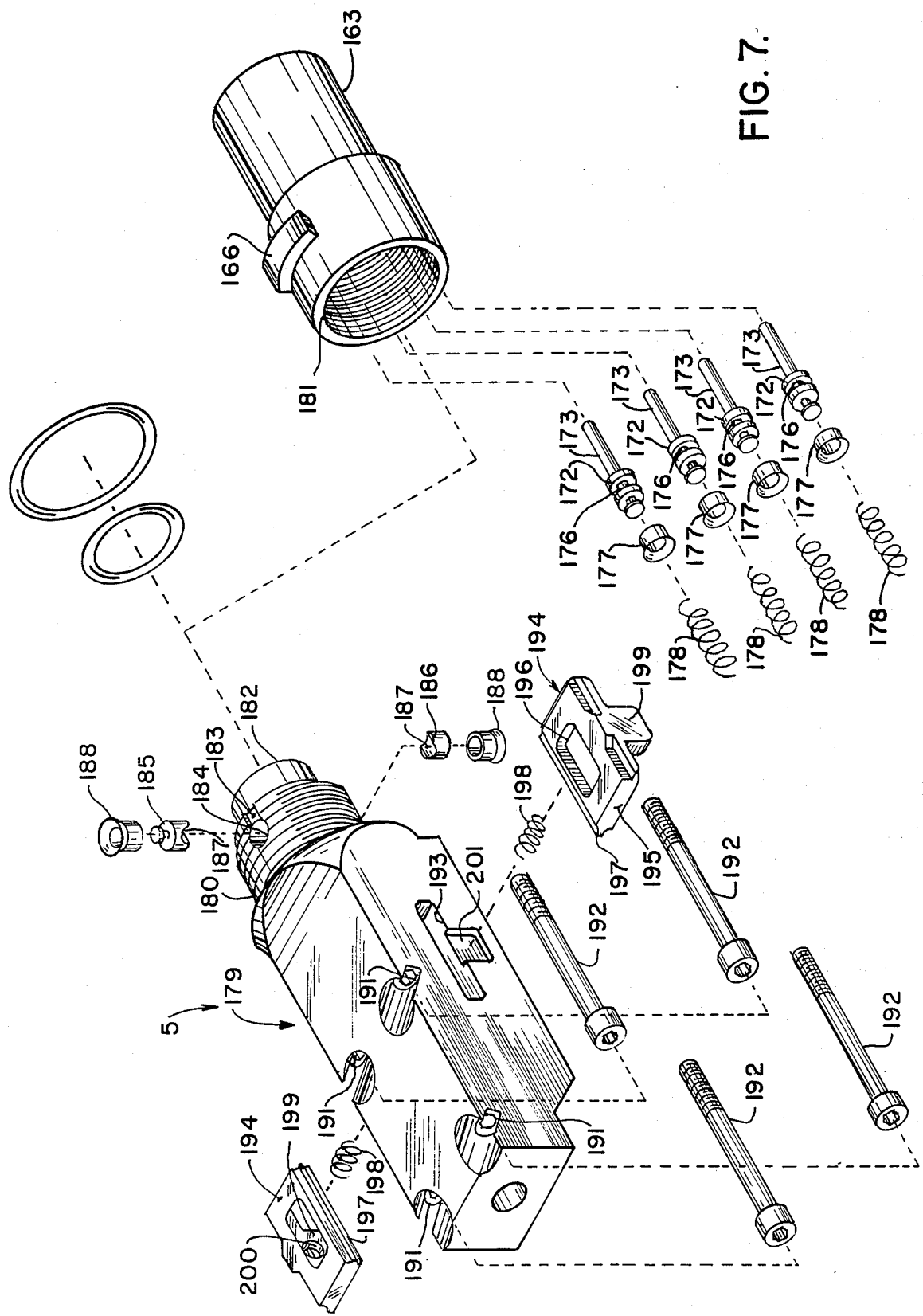
FIG. 7 is an exploded view of the fastener feed housing support that cooperates with the front of the tubular housing as shown in FIG. 3.

FIG. 7 also discloses the fastening means positioning housing, as at 179, which is designed for providing a degree of closure and for holding the uppermost fastening means, that which is to be next driven, so as to assure its reasonable sealing therein, for reasons as previously explained. But, the back end of this housing includes an integrally threaded portion, as at 180, and this particular portion is designed for threadedly engaging within the enlarged threaded end 181 of the brake means housing 163. Thus, it can also be seen that the threaded end 180 has a sleeve like means 182 extending slightly rearwardly thereof, and that proximate its surface, are a pair of formed grooves, as at 183, upon both its upper and lower surfaces, with only the upper one being shown herein. See also FIG. 26. Each of these grooves communicate with an aperture, as at 184, and into each aperture, at both its upper and lower surfaces, there are disposed a pair of brake means, as at 185 and 186, that locate within their respective apertures. It is to be noted that these brake means are formed having arcuate braking surfaces, as generally at 187, while the opposite surface of each brake means 185 and 186 has a piston 188 communicating therewith. Thus, as can be understood, as the piston reaches the end of its combustion stroke, and the pins 172 encounter the surface 175 of the piston rod 151, since there is a hydraulic or other type of fluid means provided within the chamber 171, forwardly of their seals 177, this fluid becomes highly compressed, forces the piston 188 internally of the sleeve 180, within their apertures 184, thereby forcing the brake means 185 and 186 to exert a pressure by means of their arcuate surfaces 187 tightly upon the rod portion 152 of the piston rod, which provides a means for controlling the forward extent of thrust of the rod, and which has been designed and determined to brake the rod just at that point when it has satisfactorily and adequately driven the fastener into its intended surface. As previously summarized in this application, this is designed to provide longevity to the life of this tool, and to provide the means for dampening that final impact that is exerted within the structure, due to the heavy forces generated during an ignition when combustion occurs and the piston is driven.

The fastener means housing 79 while previously herein reviewed as cooperating with the brake means of this invention, for dampening the effects of the forward limit of the extent of the stroke of the piston rod, during a tool firing, actually this housing also functions for other purposes, as the name obviously implies. It is structured for operating as a means for positioning of the next fastener means into position for a firing, and likewise, acts as a forward mount to the upper end of the magazine means 6, as previously summarized. In any event, as can also be seen in FIGS. 7, 24 through 26, and 56 through 58, the housing 179 has a central channel 189 provided longitudinally therethrough, and this is aligned with the previously defined channel 26, within the housing assembly 2, in addition to the channel 165, provided through the brake means housing 164, and is designed for accommodating the shift of the forwardly moving rod 152 of the piston rod assembly therethrough, during a fastener driving function. Initially, as can be noted, there is a rather uniquely shaped series of passages, as at 190, provided upwardly upon an incline through the bottom segment of the housing, and this is designed for accommodating the passage of the fastener strip, supporting a series of fasteners, therethrough, as shown in FIGS. 45 and 46. In addition, the upper edges of the feed means of the magazine device for delivering fasteners on their strip into the fastener housing 179, must also be accommodated within the designed passage 190, particularly when the final fasteners of a strip may be achieving a positioning or locating within the housing for a firing. In addition, it can be seen that there are a series of inclined slots, as at 191, provided upon an angle through the housing 179, and these are designed for accommodating the screws 192, as noted, when tightening and fastening onto the upper end of the magazine means 6, as will be subsequently described.

Figure 26:
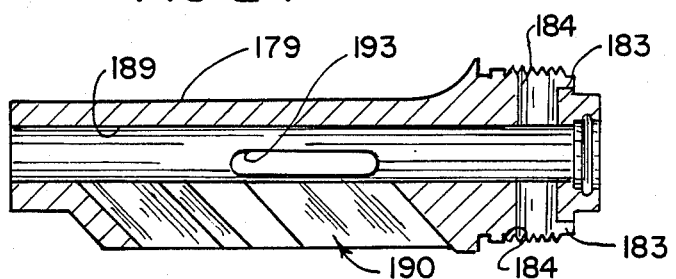
FIG. 26 is a longitudinal sectional view of the fastener chamber as shown in FIG. 24, and taken along the line 26—26 of FIG. 25.
Figure 27:
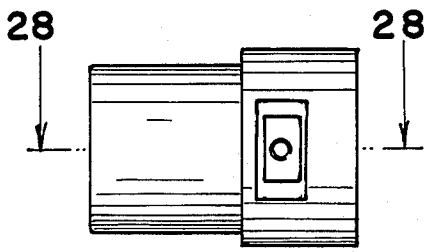
FIG. 27 is a side view of the brake means housing for the invention.

Provided laterally through the housing 179 are additional slots 193, one upon either side of the housing 179, and which slots communicate into the channel 189, as previously identified. Designed for fitting into these slots are the closure and positioning plates 194, each of which plate includes an upper, plate like means 195, having an aperture at 196 provided therethrough, and being arcuately tapered along an arcuate path at its leading edge, as at 197, which, when these two plates 194 mate together, at the proximate center of the housing 179, form a partial closure generally beneath the upper fastener F that may be located therein, in preparation for its immediate firing. As can be understood, when these two plates 194 come together, and mate, at the center of the housing 179, that arcuate surface forms a rather semi-circular groove, that encloses just proximate the bottom of the head portion of any fastener located therein, and generally forms a rather bottom surface for the channel 189, since, as can be seen in FIG. 26, the slots 193 are located generally at the lower segment of the channel 189, in order to form a bottom surface for that channel, when the closure means 194 are forced toward closure, and brace against the pinched sides of the strip holding the fasteners, as can be noted from FIG. 46. Normally these closure plates 194 are biased externally of the housing 179, a sufficient distance, to withdraw from within the channel 189, and this is attained by means of the spring means 198 seating within the downwardly extending flanges 199 of each closure means, and generally within their respective counterbores 200. In addition, the same spring means, on both sides, will bias against the surface 201 to achieve that continuing compressive bias outwardly of the closure plates 194, as explained.

As can also be seen in FIG. 6, there are a pair of guide rods 202 and 203, comprising left and right hand rods, that are also installed along the lateral edges of the frontal portion of the tool,, as can also be noted in FIG. 1. These rods are designed for extension through those formed internal slots 143 and 144 as previously defined as extending generally the length of the tubular assembly 2, with the back edges of said rod having inturned segments, as at 204 and 205, respectively, with these inturned segments being designed for insertion within the slots 150 provided laterally of the combustion cylinder 148, as previously defined. The forward portions of each of the guide rods 202 and 203 taper inwardly, forming an inclined camming surface, for each rod, as at 206 and 207, respectively, and these portions of the rods extend significantly forwardly, to their reduced frontal ends 208 and 209, as noted. These ends are designed for fitting into correspondingly shaped apertures 210 and 211, respectively, of the pressure plate 212. It is to be noted that the pressure plate 212 also has a central aperture, as at 213, provided therethrough, and it is through this aperture that the fastener is thrusted when driven rapidly forwardly into and through the surface into which it is intended to be driven. In addition, mounted to the bottom extension 214 of the pressure plate 212 is a rearwardly extending pin 215, and which pin is designed for functioning as a form of stop means that locates the fastener means strip, and its fasteners F, into position, when the uppermost fastener becomes located within the fastening means housing, and likewise, stabilizes the positioning of the strip in place, to prevent its forward bend, as when a firing takes place. Nevertheless, as can be detected, when the tool of this invention, as shown in FIG. 1, is forced against the surface into which a fastener is to be driven, the pressure plate 212 is forcefully urged against that surface, thereby forcing the guide rods 202 and 203 rearwardly within the tubular housing 2. When this occurs, a series of functions are performed. One, the pin 215 eventually comes into contact and rests against the fastener means supporting strip. But, in addition, the canted portions 206 and 207 or their slanted surfaces thereabove, eventually come into contact with the exterior surfaces of the closure plates 194, which forces them inwardly within the housing 179, against the bias of their springs 198, until such time as their tapered leading edges 197 tightly bind against the pinched sides of the fastener strip located in proximity therewith, and generally form a type of closure for the chamber in which the uppermost fastener locates. There is sufficient incline provided by those edges 206 and 207 to just achieve that effect during performance of this function. In addition, those inturned segments 204 and 205 of the guide rods 202 and 203, which as previously explained are located within the slots 150, of the combustion chamber housing 148, also forces the combustion chamber 158, and its cooperating piston rod assembly 151, rearwardly, also under the bias of the piston rod spring 155, until such time as its cylinder 147 is forced against the next cartridge of the strip C that is in alignment for firing, forcing it up into said chamber 158, in preparation for a firing. Likewise, as this occurs, the forward end of the carriage means 116, and more particularly its leg 118, will be forced somewhat rearwardly, to achieve an indexing of the strip, and simultaneously the housing 148 biases against the push rod 40, thereby providing for a recocking ,of the entire trigger assembly of this device, in the manner as previously detailed, so that the entire apparatus, as forcefully being pushed against the wall by the worker, is now ready for a firing. This does require the exertion of an adequate amount of force against this entire tool T, by the worker, in order to achieve a setting of this entire instrument into that position where it is ready for firing, and such generally cannot be achieved unless the full weight of the worker is exerted upon the tool, and thrusted against a very stable surface, such as wall, floor, or the like, to attain that operative setting for the instrument.

The magazine means for this invention has generally heretofore been defined as providing that instrument for automating the delivery of fasteners into position for sequential driving by means of cartridge firing into a designated surface. The fasteners F, within their designed strip, are generally shown in FIGS. 45 and 46. As can be seen, it comprises a strip of what preferably is a form of polymer material, integrally molded as one piece, generally as disclosed at 216. This strip has a series of aligned forwardly extending boss like members 217, each of which is designed for holding a fastener F tip into position, as noted. It is this type of strip that is loaded into the magazine means of this invention, in order to automate this aspect of the tool.

Figure 8:
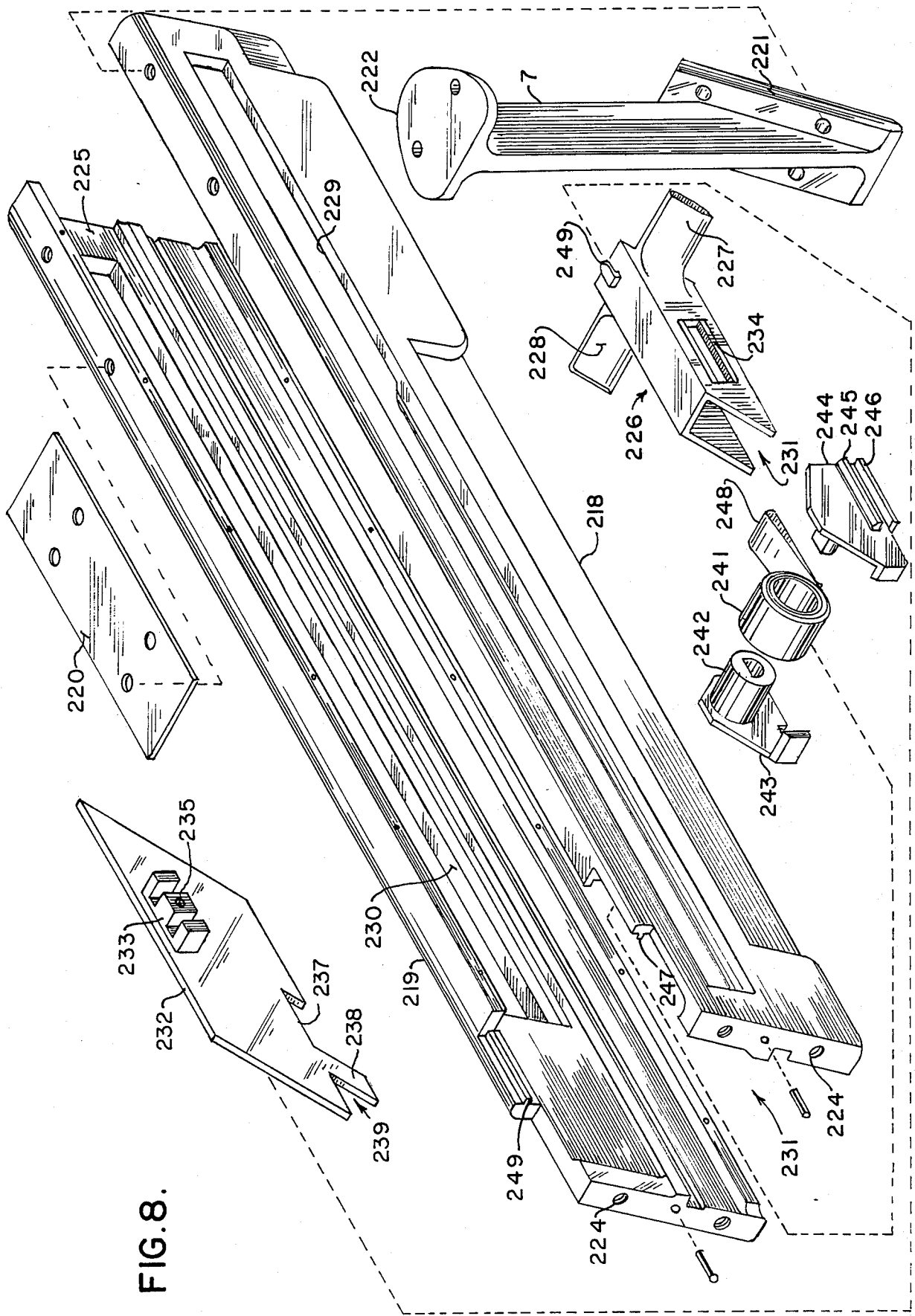
FIG. 8 is an exploded view of the magazine feed means for delivery of the fasteners of this invention.
Figure 24:
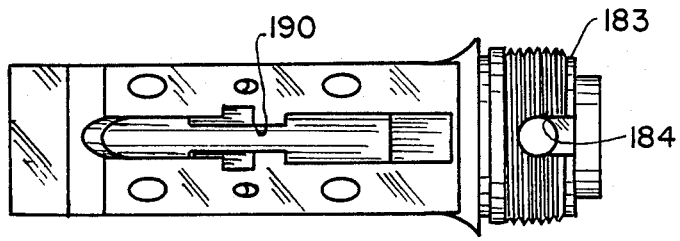
FIG. 24 is a bottom view of the fastener locating chamber and sleeve of this invention, as also shown in FIGS. 1 and 7.
Figure 25:
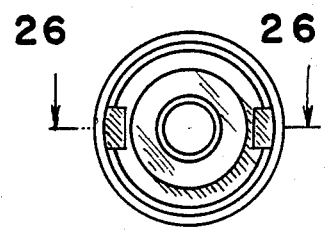
FIG. 25 a back view thereof.

The location of the magazine means 6 within the tool is generally disclosed in FIG. 1. The positioning of the plurality of fastener means F, and their supporting strip 216, is shown in FIG. 2. FIG. 8 discloses the left and right side sleeves 218 and 219, respectively, which complimentarily fit together to form the magazine feed housing. The lower end of the housing has a gasket 220, that mounts thereon, and underlies the lower integral plate 221 of the brace 7 when a series of fasteners (not shown) are applied into the disclosed aligned apertures. The upper end of the brace 7 has a platform, as at 222, that connects with the under surface of the handle 12 of the tool. The upper edge, of the magazine housing, has a series of threaded apertures, as at 224, provided therein, and it is within these apertures that the fasteners 192, as previously explained, threadedly engage. Also, aligning pins as shown in FIG. 8 may be used to line up these components during assembly. Thus, through this means of defined connection, the magazine is rigidly held into position, between the lower front end of the tool, and underneath of the handle portion for the same, firmly secured into the structure of this tool. Disposed for movement within the formed groove, as at 225, of the sleeves 218 and 219, is a slide member 226, which includes a pair of integrally extending flanges 227 and 228, which are designed for extending through the elongated slots 229 and 230, respectively, of the sleeves 218 and 219, and generally are exposed to the exterior of the magazine housing, when formed, to be conveniently gripped by the fingers, of the worker, as when it may be desired to retract the member 226, as when it is necessary to load another fastener strip 216 into the instrument. Designed for locating within the formed slot 231 is a pusher plate 232, which has a mounting boss 233 extending laterally from one side, and which is designed for insertion through the slot 234 provided to one side of the said, member 226. Then, a screw means, as shown in FIGS. 53 and 54, threadedly engages within the threaded aperture 235 to reasonably fix the pusher plate 232 with the slide member 226, as can be understood. A spring means upon the screw 236 holds the pusher plate 232 out of the fastener strip slot when the plate reaches the bottom of the magazine, or during a reloading. The upper frontal edge of the pusher plate 232 includes a cut-out portion, as at 237, and which forms an extending stem 238, with the junction, as at 239, between the stem and the plate but more particularly the pointed front thereof, providing a cradle or means in which the bottom edge, as at 240 (See FIG. 45), of the fastener strip locates, when loaded into the magazine means 6 of this invention. The extending stem 238, when the magazine is out of fasteners, contacts the rearwardly extending pin 215 to prevent the tool from resetting or firing.

In order to provide a continuous bias of the magazine strip upwardly towards the fastener housing 179, as required, a spring means 241, which may be a form of retraction spring, is wound around the spindle 242 of its mount which is formed of a pair of support halves 243 and 244 when joined together. Each support has a pair of rails, 245 and 246, which are designed for insertion upon the rails 247 to mount the spring and its support proximate the upper inner edge of the magazine feed housing, where noted. Thus, the downward end of the spring, or that end 248, includes a link means upon its downward surface, for connection onto the connector 249, of the slide member 226, so that as the member is pulled downwardly, for loading of a fastener strip therein, the further the pull of the spring, the tighter will be the bias of the spring upon the member 226, and its shift plate 232, to urge that strip of fasteners upwardly within the magazine means, and for continuously urging its uppermost fastener into that chamber 189 of the fastener housing 179, as previously explained.

Variations or modifications to the subject matter of this invention may occur to those skilled in the art upon reviewing the description of the invention as provided herein. Such variations or modifications, if within the spirit of this invention, are intended to be encompassed within the scope of any claims to patent protection issuing upon this development. The description of the preferred embodiment set forth herein is done so for illustrative purposes only.

Having thus described the invention what is claimed and desired to be secured by Letters Patent is:

1. A fastener driving tool for use for driving a nail or other anchor into a hardened surface such as of concrete, metal, or the like, said tool useful for feeding a cartridge strip of explosive cartridges through the tool for repeated subsequent driving sequentially of a plurality of magazine fed fasteners into such a surface, said tool including a handle means, a tubular cylinder provided extending forwardly from said handle means, a cartridge chamber provided at the rear of said tubular cylinder means for contiguous reception of a cartridge therein in preparation for a firing, a piston means having a cartridge chamber operatively associated with its back end provided within the tubular cylinder means and provided for reciprocal movement therein between a set position arranged approximate the back segment of said tubular cylinder means and at its front segment as after a firing and for driving of a fastener in place, said tubular cylinder and piston means capable of being reset in preparation for a firing, a feed housing means operatively associated with said handle means and tubular cylinder, and providing an indexing of the cartridge strip through the feed housing means upon the handle means for selective positioning of a next cartridge aligned with the cartridge chamber in preparation for a next firing, a fastener housing operatively associated with the forward end of the tubular cylinder, and provided for reception singly of fastener means in preparation for a next firing, and a magazine means connecting with the fastener housing, and provided for delivery of a series of held fasteners sequentially into the fastener housing during repeat usage of the driving tool.

2. The invention of claim 1 and including indexing means operatively associated with the feed housing means and provided for sequential shifting of the magazined cartridges through the tool during usage.

3. The invention of claim 1 and wherein said magazine means at its upper end connecting with the fastener housing, said magazine means, at its lower end, connecting with the approximate downward end of the handle means for the tool.

4. The invention of claim 3 and including a brace means connecting with the downward end of the handle means, and said brace means fastening with the approximate downward end of the magazine means.

5. The invention of claim 3 and wherein said magazine means includes a housing, a slide means operatively associated within the housing for contact against the fastener strip and continuously urging it upwardly within the magazine means and towards the fastener housing, spring means connecting with the slide means and providing the force tending to continuously urge the said slide means and the fastener strip upwardly within said magazine means.

6. The invention of claim 5 and including a pusher plate operatively associated with the slide means and contacting against the fastener strip to urge it upwardly within the magazine means.

7. The invention of claim 6 and wherein said pusher plate including a forwardly extending tab, said tab cradling the bottom of the fastener means strip for urging it upwardly within the magazine means.

8. The invention of claim 7 and wherein said slide means including at least one laterally extending flange, said magazine means housing having at least one elongated slot provided therethrough, said flange means extending through said slot and disposed for manual grasping for manipulation of the slide means, and the fastener means strip, within its magazine means.

9. The invention of claim 8 and wherein there are a pair of flanges extending from each side of the slide means, and extending laterally through the housing slots of the magazine means.

10. The invention of claim 9 and wherein said spring means comprising a retractable spring, said spring means mounted proximate the upper end of the magazine means, the opposite end of the spring means attaching with the slide means and normally urging the said slide means upwardly within the magazine means for delivery of the fasteners and its supporting strip continuously upwardly within the said magazine means.

11. The invention of claim 2 and including an indexing wheel included within the indexing means and providing for the sequential shifting of the magazined cartridges through the tool 12. The invention of claim 11 and wherein said indexing wheel providing for the lateral shifting of the cartridge strip through the tool during its application.

13. The invention of claim 11 and wherein said fastener housing having a longitudinal chamber provided therethrough, said chamber disposed for reception of a fastener therein in preparation for a firing of the tool, and said fastener being aligned with the piston means and to be driven by the said piston means upon a firing of the said tool.

14. The invention of claim 13 and wherein said fastener being held by a strip within said magazine means, said strip having shaped means between each series of held fasteners to facilitate the retention of the uppermost fastener within the fastener housing chamber in preparation for a tool firing.

15. The invention of claim 14 and wherein said shaped means comprising a pinched formation on each side of the said strip and between each adjacent fastener for cooperating with means operatively associated with the fastener housing for holding the uppermost fastener into position for driving.

16. The invention of claim 15 and wherein said fastener housing including means for holding the uppermost fastener into position for its driving into a surface and for tending to close off the said uppermost fastener within its chamber in preparation for a tool application, said means including a pair of closure plates, one each inserting through each side of the fastener housing, and pressure means urging said closure plates within the housing for locating and effecting a partial closure of the uppermost fastener within its housing chamber.

17. The invention of claim 16 and including spring means arranged between the closure plates and the fastener housing and tending to urge the said plates normally into a chamber opened condition.

18. The invention of claim 17 and wherein each plate having a tab extending therefrom and cooperating with the said spring means to urge its associated plates into a chamber opened condition.

19. The invention of claim 13 and including brake means connecting with the fastener housing, said brake means mounting to the tubular housing, said brake means upon actuation contacting the piston means to reduce its forward thrust as the said piston means reaches the forward extent of its stroke.

20. The invention of claim 19 and wherein said brake means including a brake housing, said housing having a longitudinal chamber therethrough for shifting of the piston means therein, brake initiation means extending rearwardly from the brake housing and disposed for contact by the piston means as it travels towards the forward extent of its stroke, brake shoe means provided within the brake housing and designed for being exerted against the piston means to decelerate its forward stroke when the brake initiation means is contacted by said piston means during a tool driving of a fastener.

21. The invention of claim 20 and wherein said brake housing having at least one fluid chamber therein, said chamber subjected to compression upon movement of the brake initiation means upon contact by the piston means, and the generated compression within the fluid compression chamber exerting pressure upon the brake shoe means for forcing them against the piston means to reduce the forward movement of its stroke.

22. The invention of claim 19 and including guide rod means operatively associated with the fastener housing, the tubular assembly, and the piston means, a pressure plate connecting upon the frontal end of the guide rod means, said guide rod means, at its other end, fixed with the combustion chamber of the piston means, whereby upon a rearward shift of the guide rod means the piston means and its cylinder chamber are shifted rearwardly for providing a contiguous reception of the next cartridge within the combustion chamber operatively associated with the tubular chamber in preparation for a tool firing.

23. The invention of claim 22 and wherein said fastener housing including means for holding the uppermost fastener into position for driving into a surface and for tending to close off the said fastener within its chamber in preparation for a tool firing, said means including a pair of closure plates, one of each inserting through each side of the fastener housing pressure means urging said closure plates within the housing for locating and effecting a partial closure of the uppermost fastener within its chamber, and said pressure means comprising the contact of the guide rod with the said closure plates during a rearward shifting of the said guide rods during manipulation of the tool in preparation for its firing.

24. The invention of claim 23 and wherein said guide rods include a beveled surface for contact against the closure plates and to urge their shifting within the fastener housing to attain a locating of the fastener and its strip into position for a driving and for partially closing off the fastener housing chamber containing the uppermost located fastener.

25. The invention of claim 11 and further including a carriage supported by the feed housing means, said indexing wheel responsive to the movement of said carriage means during indexing of said magazined cartridges, and said carriage means being responsive to the rearward movement of said tubular cylinder for effecting shifting of the next cartridge into position for alignment with the combustion chamber in preparation for the next firing of the tool.

26. The invention of claim 25 and wherein said carriage means longitudinally shifts within the feed housing means, and said indexing wheel being horizontally disposed for partial turning during each shift of the said carriage means.

27. The invention of claim 26 and including a dog carried by the carriage means, said index wheel having surface gears provided thereon, said dog disposed for engagement with the surface gears during each rearward shift of the carriage means for providing a predetermined partial turn of the indexing wheel for effecting shifting of the cartridge strip.

28. The invention of claim 27 and wherein said carriage means including a pair of legs, one leg supporting the dog, the other leg disposed for contact by the barrel cylinder means, during its rearward movement as during a resetting of the tool for a subsequent firing.

29. The invention of claim 28 and wherein each leg of the carriage means also inserting within the feed housing means for support during its shifting.

30. The invention of claim 25 and further including a positioning means operatively associated with the feed housing and provided in alignment with the indexing wheel for providing final positioning of said indexing wheel for precise locating of the next cartridge in alignment with the combustion chamber in preparation for the next firing of the tool.

31. The invention of claim 30 and wherein said indexing wheel having a series of shallow cavities upon its side opposite from its arranged surface gears, said cavities disposed for sequential reception of the positioning means therein.

32. The invention of claim 25 and wherein each cartridge strip having a series of spaced slots provided therein, said indexing wheel having a series of radial teeth provided extending therefrom, at least one wheel tooth engaging within a strip slot during indexing for providing the lateral shift to the cartridge strip in preparation for the next firing of the tool.

33. The invention of claim 32 and including a locating pin spring biased within the feed housing means and in alignment for riding upon an edge of the cartridge strip and for locating within a slot for providing precise alignment of the next cartridge with the combustion chamber for the tubular cylinder in preparation for the next firing of the tool.

34. The invention of claim 25 and including a transverse slot provided through the tubular cylinder and through which the cartridge strip is indexed in preparation for the firing of the tool, firing pin means operatively associated with the tubular cylinder and in alignment rearwardly of the said slot arranged cartridge strip, and a trigger means carried by the handle means and which when shifted providing for actuation of the firing pin means and a firing of the aligned cartridge.

35. The invention of claim 34 and including a sear means operatively associated with the firing pin means, a push rod means cooperating with the sear means to hold it and the firing pin means in cocked position in preparation for a firing, a trigger lever means responsive to the shifting of the trigger means and providing for a release of the sear means for discharge of the firing pin means and a firing of the aligned cartridge, said sear means riding upon the push rod means after its release.

36. The invention of claim 35 and wherein said push rod means having an aperture therethrough, said sear means partially arranged within said aperture when arranged in its cocked position, and said trigger means pushing said sear means from said aperture for initiating a firing.

37. The invention of claim 35 and wherein the front of said push rod means contacting the said tubular cylinder upon the forced rearward movement of said tubular cylinder for effecting a rearward shift of the push rod means and a resetting of the sear means and its firing pin means in preparation for the next firing of the tool.

38. The invention of claim 25 and wherein said handle means having a cavity formed therein for storage of tools or said handle means.

39. The invention of claim 38 and wherein said cover means formed of cushioning material to absorb the forces of impact upon a firing of the tool.

40. The invention of claim 39 and wherein said cushioning material formed cover provided upon the back of the handle means.

41. The invention of claim 40 and wherein said cushioning material formed cover extending over the entire back side of the tool and also covering the rear of the said feed housing means.

42. The invention of claim 25 and wherein said tubular cylinder having an opening through its lower surface, a debris attractor mounting upon the tubular cylinder and communicating with its opening for providing for collection of any debris from the exhaust of the fired cartridge.

43. The invention of claim 42 and wherein said debris attractor having a substantial cavity formed therein for collecting an accumulation of the exhaust debris discharging upon the repeat firing of the tool.

44. The invention of claim 43 and wherein said debris attractor also designed for muffling the sounds generated during the firing of a tool.

* * * * *

UNITED STATES PATENT AND TRADEMARK OFFICE
CERTIFICATE OF CORRECTION

PATENT NO. : 4,858,811
DATED : August 22, 1989.
INVENTOR(S) : James R. Brosius; Ralph C. Brosius.

It is certified that error appears in the above—identified patent and that said Letters Patent is hereby corrected as shown below:

Column 24, claim 16, line 4, change "15" to ---13---.

Column 26, claim 38, line 37, insert after "or" and before "said", ---the like, and a cover for the said cavity, engaging upon the---.

Signed and Sealed this

Nineteenth Day of June, 1990

*Attest:*

HARRY F. MANBECK, JR.

*Attesting Officer*  *Commissioner of Patents and Trademarks*